(12) United States Patent
Lee et al.

(10) Patent No.: US 11,554,667 B2
(45) Date of Patent: Jan. 17, 2023

(54) DISPLAY DEVICE PROVIDED IN VEHICLE AND CONTROL METHOD OF DISPLAY DEVICE

(71) Applicant: LG Electronics Inc., Seoul (KR)

(72) Inventors: Jinsang Lee, Seoul (KR); Eunjin Kim, Seoul (KR); Yonghwan Lee, Seoul (KR); Junho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 16/767,378

(22) PCT Filed: Dec. 12, 2017

(86) PCT No.: PCT/KR2017/014575
§ 371 (c)(1),
(2) Date: May 27, 2020

(87) PCT Pub. No.: WO2019/117333
PCT Pub. Date: Jun. 20, 2019

(65) Prior Publication Data
US 2020/0391593 A1 Dec. 17, 2020

(30) Foreign Application Priority Data

Dec. 11, 2017 (KR) .................... 10-2017-0169598

(51) Int. Cl.
| | |
|---|---|
| *B60K 35/00* | (2006.01) |
| *G09G 5/373* | (2006.01) |
| *G08G 1/095* | (2006.01) |
| *G08G 1/0962* | (2006.01) |

(52) U.S. Cl.
CPC ............. *B60K 35/00* (2013.01); *G08G 1/095* (2013.01); *G08G 1/09626* (2013.01); *G09G 5/373* (2013.01); *B60K 2370/167* (2019.05); *B60K 2370/193* (2019.05); *B60K 2370/52* (2019.05); *G09G 2380/10* (2013.01)

(58) Field of Classification Search
CPC ............. B60K 35/00; B60K 2370/167; B60K 2370/193; B60K 2370/52; G08G 1/095; G08G 1/09626; G09G 5/373; G09G 2380/10
See application file for complete search history.

(56) References Cited

U.S. PATENT DOCUMENTS

| | | | |
|---|---|---|---|
| 9,266,429 B2 * | 2/2016 | Tippelhofer | .......... G06F 3/0481 |
| 2002/0133285 A1 * | 9/2002 | Hirasago | ................ B60K 35/00 |
| | | | 701/96 |

(Continued)

FOREIGN PATENT DOCUMENTS

| | | | | | |
|---|---|---|---|---|---|
| DE | 102008032063 A1 * | 1/2010 | ............. | B60K 35/00 |
| DE | 102010050270 A1 * | 6/2011 | ............. | B60K 35/00 |

(Continued)

*Primary Examiner* — Chico A Foxx
(74) *Attorney, Agent, or Firm* — Fish & Richardson P.C.

(57) ABSTRACT

A display device included in a vehicle includes: a communication unit, a display; and a control unit. The communication unit can receive vehicle travel information. The processor can calculate a speed range based on the received vehicle driving information and control the display to display a graphic object representative of the calculated speed range on the display.

19 Claims, 16 Drawing Sheets

(56) References Cited

U.S. PATENT DOCUMENTS

| | | | | |
|---|---|---|---|---|
| 2006/0195257 | A1* | 8/2006 | Nakamura | G01C 21/3632 701/437 |
| 2013/0110371 | A1* | 5/2013 | Ogawa | G08G 1/095 701/1 |
| 2016/0347313 | A1* | 12/2016 | Inoue | B60W 30/146 |
| 2017/0232983 | A1* | 8/2017 | Miglianico | B61L 3/008 701/19 |
| 2020/0265715 | A1* | 8/2020 | Maeda | G08G 1/096783 |

FOREIGN PATENT DOCUMENTS

| | | |
|---|---|---|
| JP | 2004247907 | 9/2004 |
| JP | 2011095833 | 5/2011 |
| JP | 2015095135 | 5/2015 |
| JP | 6184515 | 8/2017 |
| KR | 100534704 | 12/2005 |
| KR | 101352971 | 1/2014 |
| KR | 101708657 | 2/2017 |
| KR | 101717938 | 3/2017 |
| KR | 1020170060442 | 6/2017 |

* cited by examiner

▨ RECOMMENDED
▦ NOT RECOMMENDED
▨ IT DOES NOT INTERFERE WITH DRIVING, BUT IS NOT RECOMMENDED PREFERENTIALLY

DISPLAY DEVICE PROVIDED IN VEHICLE AND CONTROL METHOD OF DISPLAY DEVICE

CROSS-REFERENCE TO RELATED APPLICATIONS

This application is a National Stage application under 35 U.S.C. § 371 of International Application No. PCT/KR2017/014575, filed on Dec. 12, 2017, which claims the benefit of Korean Application No. 10-2017-0169598, filed on Dec. 11, 2017. The disclosures of the prior applications are incorporated by reference in their entirety.

TECHNICAL FIELD

The present disclosure relates to a display device provided in a vehicle and a control method of the display device.

BACKGROUND

A vehicle is an apparatus capable of moving a user in the user-desired direction. Typically, a representative example may be a car.

For convenience of a user using a vehicle, various types of sensors and electronic devices are provided in the vehicle. In particular, for the convenience of the user's driving, Advanced Driver Assistance System (ADAS) has been actively researched. In addition or alternatively, an autonomous vehicle is actively under development.

As the development of the advanced driving assist system (ADAS) is actively undergoing in recent time, development of a technology for optimizing user's convenience and safety while driving a vehicle is required.

Meanwhile, a conventional automotive instrument cluster merely serves as a simple information provider since a speed, RPM, sensor, failure (car trouble) information, etc. are displayed as a static gauge or icon.

Such an existing technology is insufficient to process and display various information collected through a sensor provided in a vehicle, V2X communication, and the like. Accordingly, there is a need to implement a new user interface for providing more information to drivers.

SUMMARY

The present disclosure is directed to solving the aforementioned problems and other drawbacks. In addition, the present disclosure is directed to providing a display device, capable of calculating an optimal speed range to be provided according to a predetermined condition based on vehicle driving information and displaying a graphic object indicating the calculated speed range on a speedometer, and a control method of the display device.

One aspect of the present disclosure is to provide a display device included in a vehicle that may comprise a communication unit configured to receive vehicle driving information, a display, and a controller configured to calculate a speed range based on the received vehicle driving information, and controlling the display to display a graphic object representative of the calculated speed range on the display. The calculated speed range may vary according to the vehicle driving information.

In some implementations, the controller may calculate the speed range based on traffic signal information on a driving road.

In detail, when approaching a predetermined area and there is a traffic light ahead of the vehicle, the speed range may include at least one of a first speed range to keep driving without stopping for entering the predetermined area according to a proceed signal of the traffic light, a second speed range to stop according to a preliminary signal of the traffic light, and a third speed range to stop according to a stop signal of the traffic light.

The graphic object may include a first graphic object corresponding to the first speed range, a second graphic object corresponding to the second speed range, and a third graphic object corresponding to the third speed range.

In addition or alternatively, the second graphic object may be an image having a predetermined color, and the predetermined color may vary according to a location of the vehicle.

In some implementations, the speed range may be equal to or greater than the first speed value and equal to or less than the second speed value. The controller may control the display such that at least one of a minimum value, a maximum value, and a unit interval of speed corresponding to a graduation interval of the speedometer is changed based on a difference in value between the second speed value and the first speed value.

In some implementations, the controller may control the display such that the maximum value of the speedometer is decreased to a predetermined value when the difference in value between the second speed value and the first speed value is equal to or less than a predetermined value.

In some implementations, the controller may control the display such that a unit interval of speed in one region of the speedometer corresponding to the speed range is reduced to a predetermined value when the difference in value between the second speed value and the first speed value is equal to or less than a predetermined value.

In some implementations, the controller may control the display such that one region of the speedometer corresponding to the speed range is enlarged to be displayed when the difference in value between the second speed value and the first speed value is equal to or less than a predetermined value.

In some implementations, the controller may control the communication unit such that a notification is output when the vehicle is not travelling within the calculated speed range for a predetermined time.

In some implementations, the controller may control the display such that the output of the graphic object is terminated when the vehicle is not travelling within the calculated speed range for a predetermined time.

In some implementations, when the vehicle is not travelling within the speed range for a predetermined time, the controller may control the display to calculate the speed range again, so that at least one of a size and a position of the graphic object is changed according to the recalculated speed range.

In some implementations, the controller may calculate the speed range based on speed limit information on a driving road.

In some implementations, the controller may calculate the speed range based on driving mode information set in the vehicle.

In some implementations, the controller may calculate the speed range based on information regarding a predetermined safe distance from another vehicle.

In some implementations, the controller may calculate the speed range based on a situation in which the vehicle enters a predetermined area.

In some implementations, the controller may calculate the speed range in consideration of status information of the vehicle.

Another aspect of the present disclosure is to provide a method for controlling a display device included in a vehicle, the method may include receiving vehicle driving information from a communication unit, calculating a speed range based on the received vehicle driving information, and activating a graphic object representative of the calculated speed range on a display. The calculated speed range may vary according to the vehicle driving information.

In some implementations, the calculating of the speed range may include calculating the speed range based on traffic signal information on a driving road.

As a specific example, when approaching a predetermined area and there is a traffic light ahead of the vehicle, the speed range may include at least one of a first speed range to keep driving without stopping for entering the predetermined area according to a proceed signal of the traffic light, a second speed range to stop according to a preliminary signal of the traffic light, and a third speed range to stop according to a stop signal of the traffic light.

The effects of a display device provided in a vehicle and a control method thereof according to implementations disclosed herein will be as follows.

According to at least one of the implementations of the present disclosure, an optimal speed range calculated in consideration of various surrounding situations (or circumstances) may be recommended based on vehicle driving information.

In addition or alternatively, each of the speed ranges may be displayed as a graphic object with a different color, shape, and size on a speedometer in a clear and simple manner, so that the driver can easily recognize (or check) the recommended speed range.

As another example, a graphic object indicating the speed range may be displayed on the speedometer in a distinctive manner by changing (or adjusting) a minimum value, a maximum value, a unit interval of speed corresponding to a speedometer graduation interval.

This may result in improving driver convenience.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the invention will be apparent to those skilled in the art.

DETAILED DESCRIPTION

Figure 1:
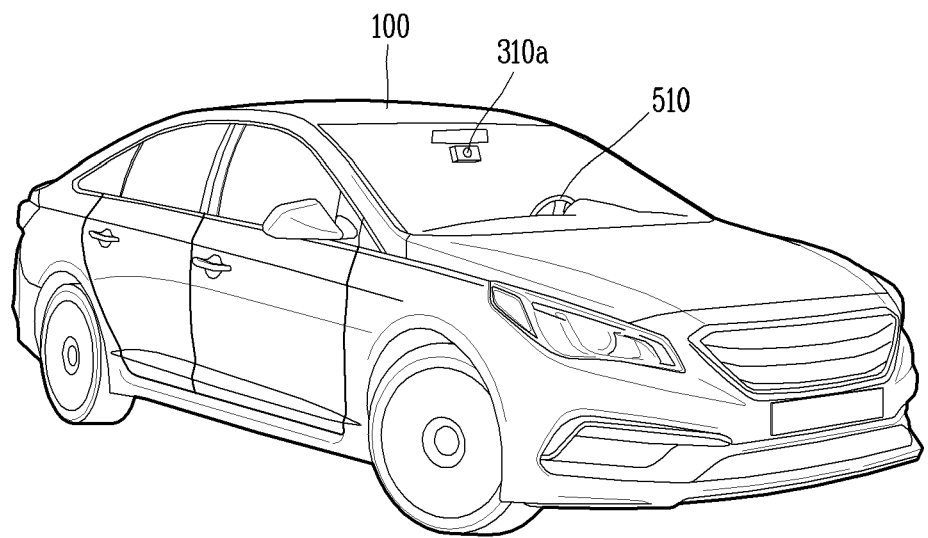
FIG. 1 illustrates an outer appearance of a vehicle.
Figure 1:
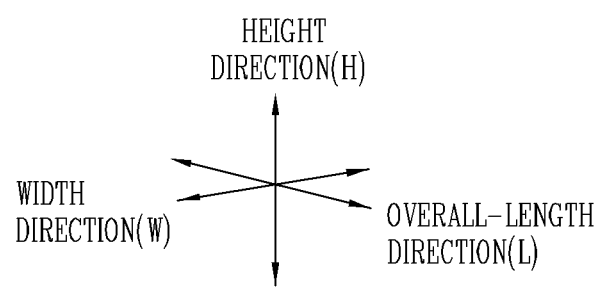

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the substance of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to some implementations of the present disclosure may be understood as a conception including cars, motorcycles and the like. Hereinafter, the vehicle will be described based on a car.

The vehicle according to some implementations of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle or the like refers to a left side in a driving (or traveling) direction of the vehicle, and a right side of the vehicle or the like refers to a right side in the driving direction.

As illustrated in FIGS. 1 to 7, a vehicle 100 may include wheels turning by a driving force, and a steering apparatus 510 for adjusting a driving (proceeding, moving) direction of the vehicle 100.

The vehicle 100 may be an autonomous vehicle.

In some implementations, the vehicle 100 may be switched into an autonomous mode or a manual mode based on a user input.

Figure 7:
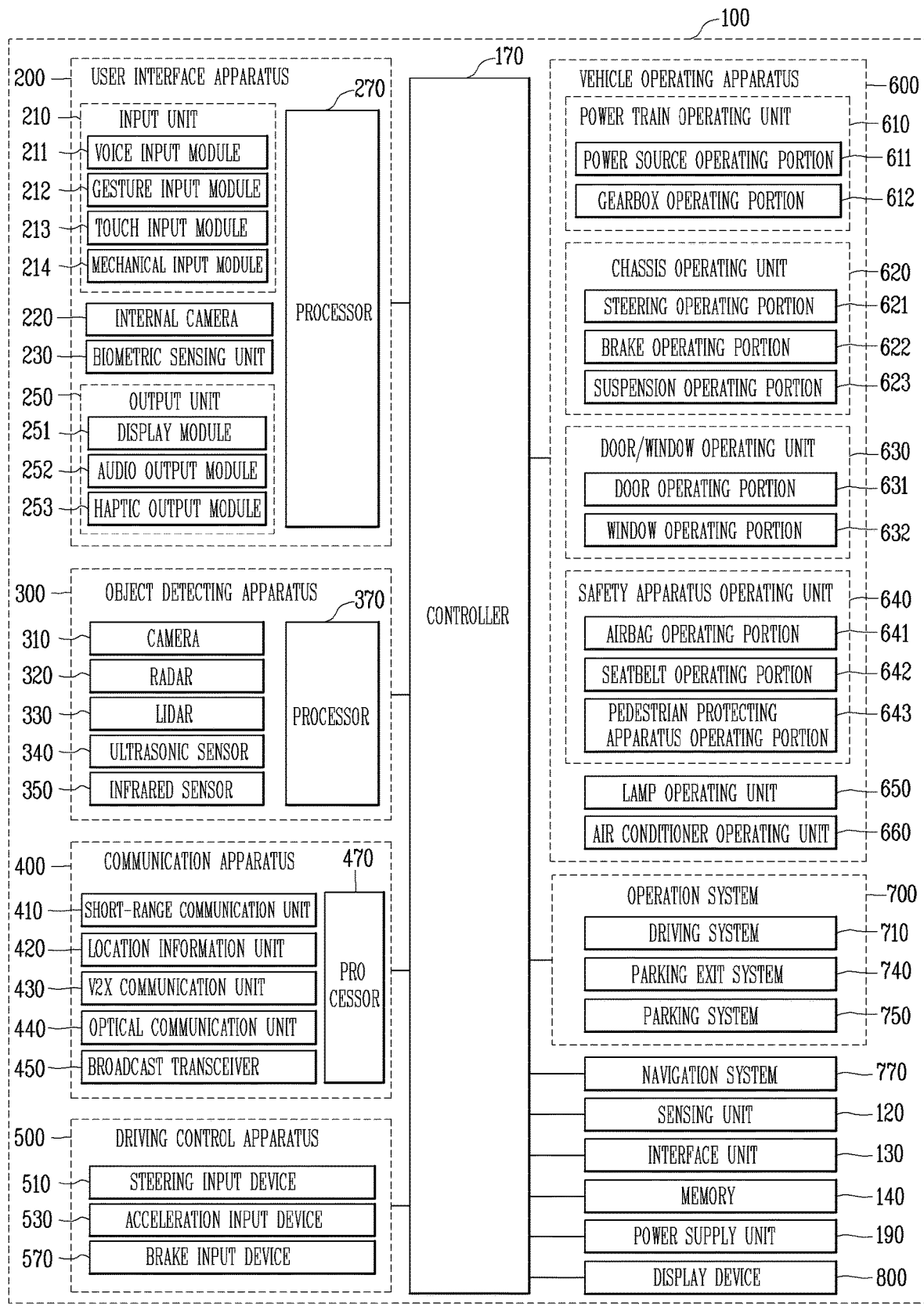
FIG. 7 is a block diagram of an example vehicle.

For example, the vehicle 100 may be converted from the manual mode into the autonomous mode or from the autonomous mode into the manual mode based on a user input received through a user interface apparatus 200 in FIG. 7.

The vehicle 100 may be switched into the autonomous mode or the manual mode based on driving environment information. The driving environment information may be generated based on object information provided from an object detecting apparatus 300 in FIG. 7.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous mode into the manual mode based on driving environment information received through a communication apparatus 400 in FIG. 7.

The vehicle 100 may be switched from the manual mode into the autonomous mode or from the autonomous mode into the manual mode based on information, data, or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740, and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller (or control unit) 170, a power supply unit 190, and a display device 800.

The vehicle 100 may include more components in addition to the components that are explained in this specification or may exclude one or more of the components described in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as a processor 270.

The user interface apparatus 200 may include more components in addition to the components that are described in this specification or may exclude one or more of those components described in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on or around a steering wheel, an instrument panel, a seat, each pillar, a door, a center console, a headlining, a sun visor, a wind shield, a window, or other suitable areas in the vehicle.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to some implementations, the gesture input module 212 may detect a user's three-dimensional (3D) gesture input. For example, the gesture input module 212 may include a light emitting diode outputting a plurality of infrared rays or a plurality of image sensors.

The gesture input module 212 may detect the user's 3D gesture input by a time of flight (TOF) method, a structured light method, or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door, and/or other suitable areas in the vehicle.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252, and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display, and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Figure 3:
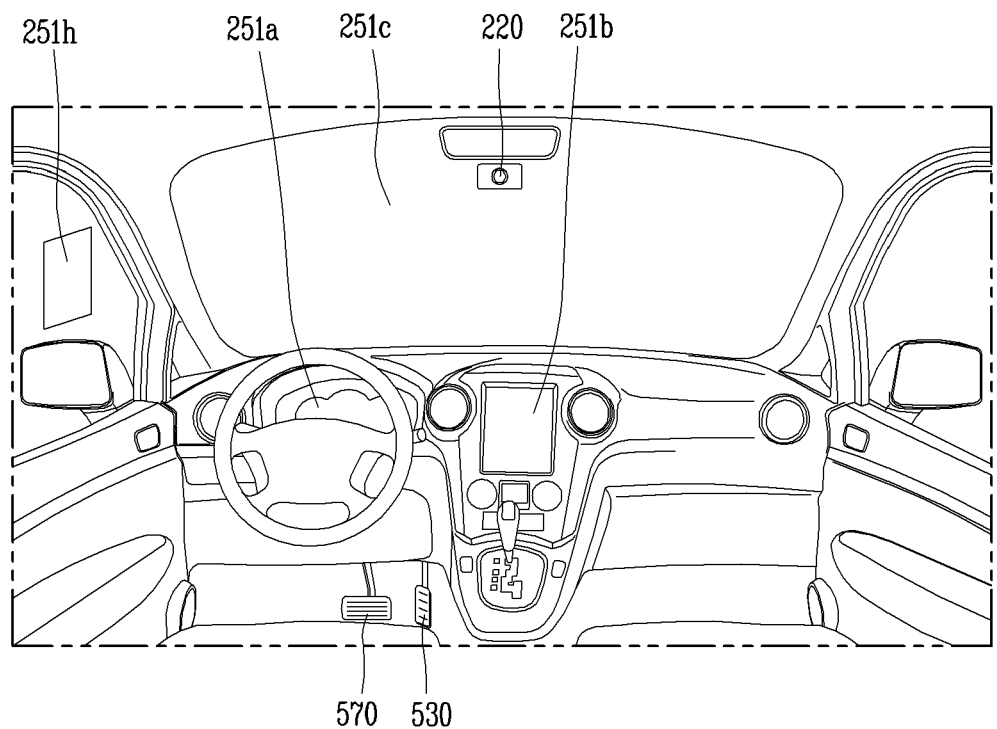
FIGS. 3 and 4 illustrate a vehicle interior.
Figure 4:
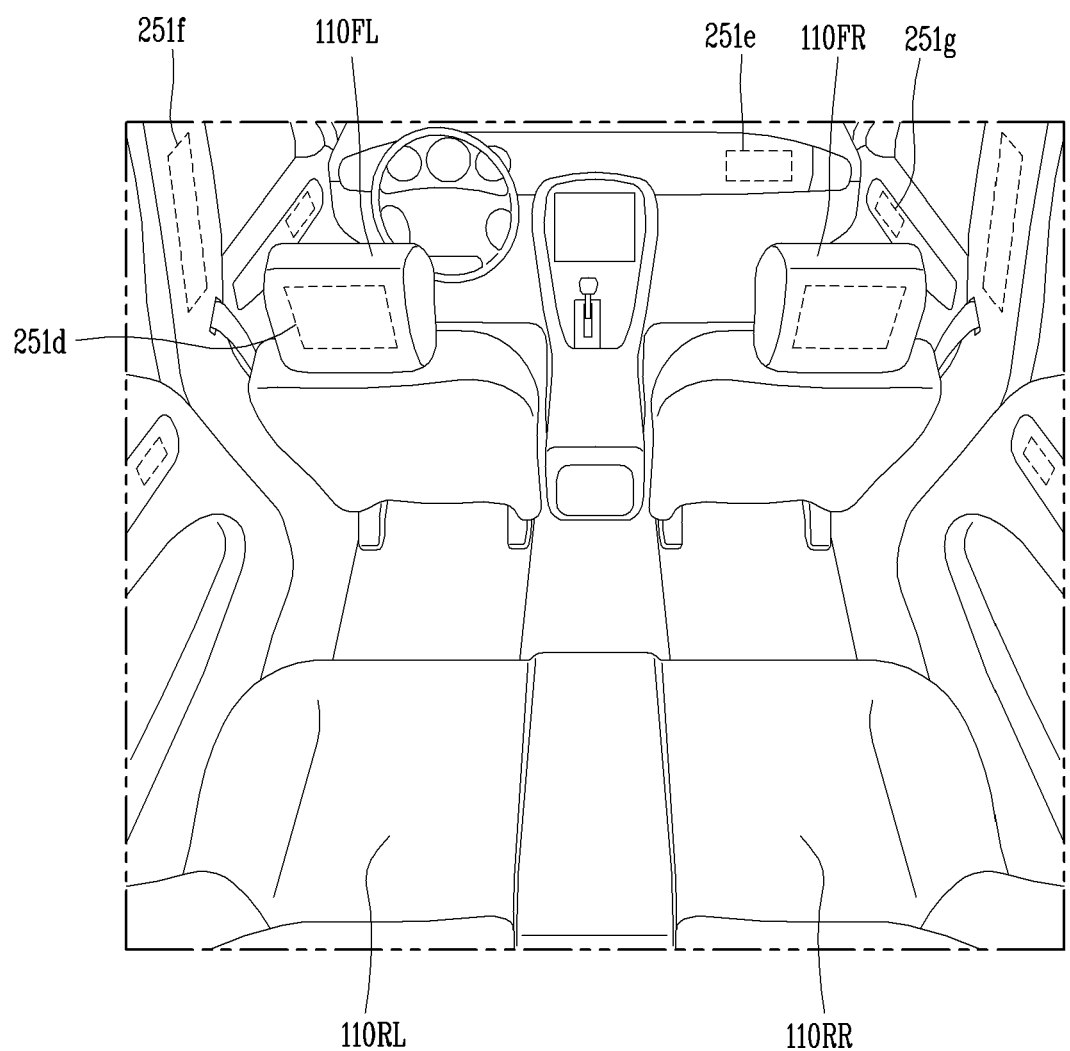
Figure 6:
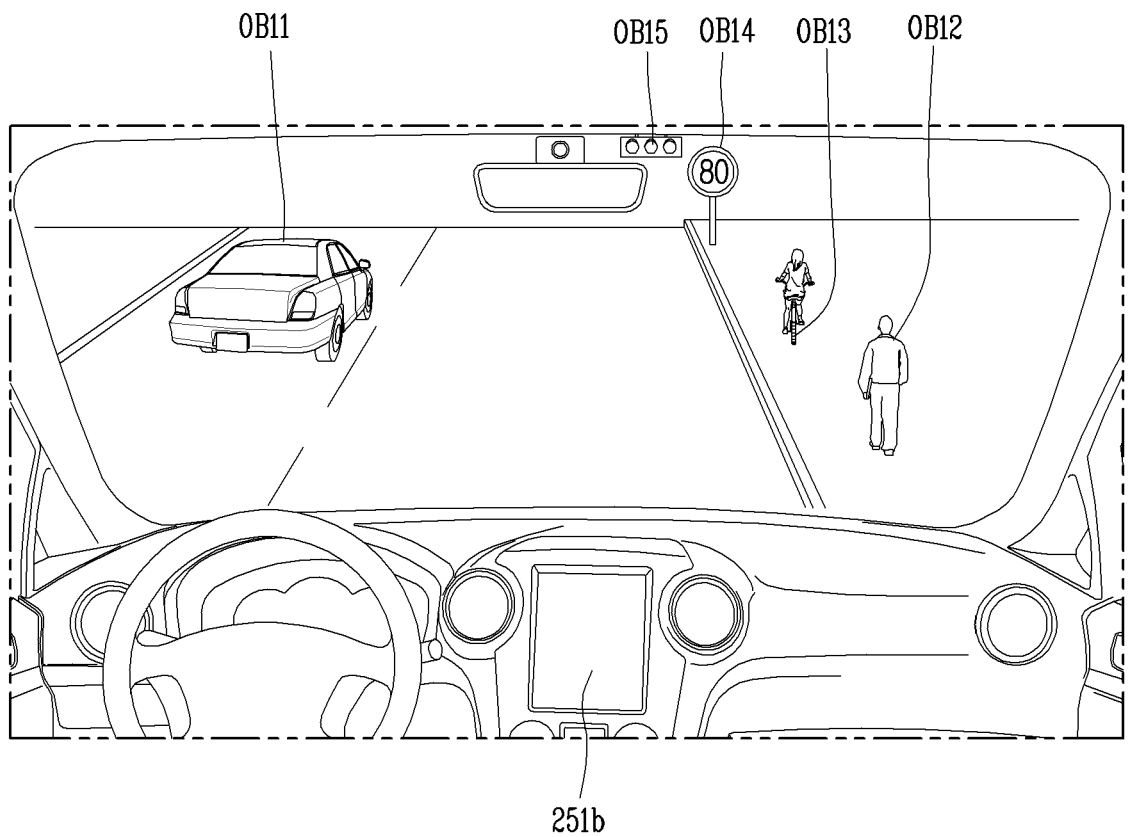

Meanwhile, the user interface apparatus 200 may include a plurality of display modules 251a to 251g as depicted in FIGS. 3, 4, and 6.

The display module 251 may be disposed on or around a steering wheel, instrument panel 251a, 251b, 251e, (as depicted in FIGS. 3, 4, and 6), a seat 251d (as depicted in FIG. 4), each pillar 251f (as depicted in FIG. 4), a door 251g (as depicted in FIG. 4), a center console, a headlining or a sun visor, or implemented on or around a windshield 251c and/or a window 251h (as depicted in FIG. 3).

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR (in FIG. 4) such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

The user interface apparatus 200 may also be referred to herein as a display apparatus for vehicle.

In some implementations, the user interface apparatus 200 may operate according to the control of the controller 170.

Referring still to FIG. 7, the object detecting apparatus 300 is an apparatus for detecting an object located at outside of the vehicle 100.

The object may be a variety of objects associated with driving or operation of the vehicle 100.

Figure 5:
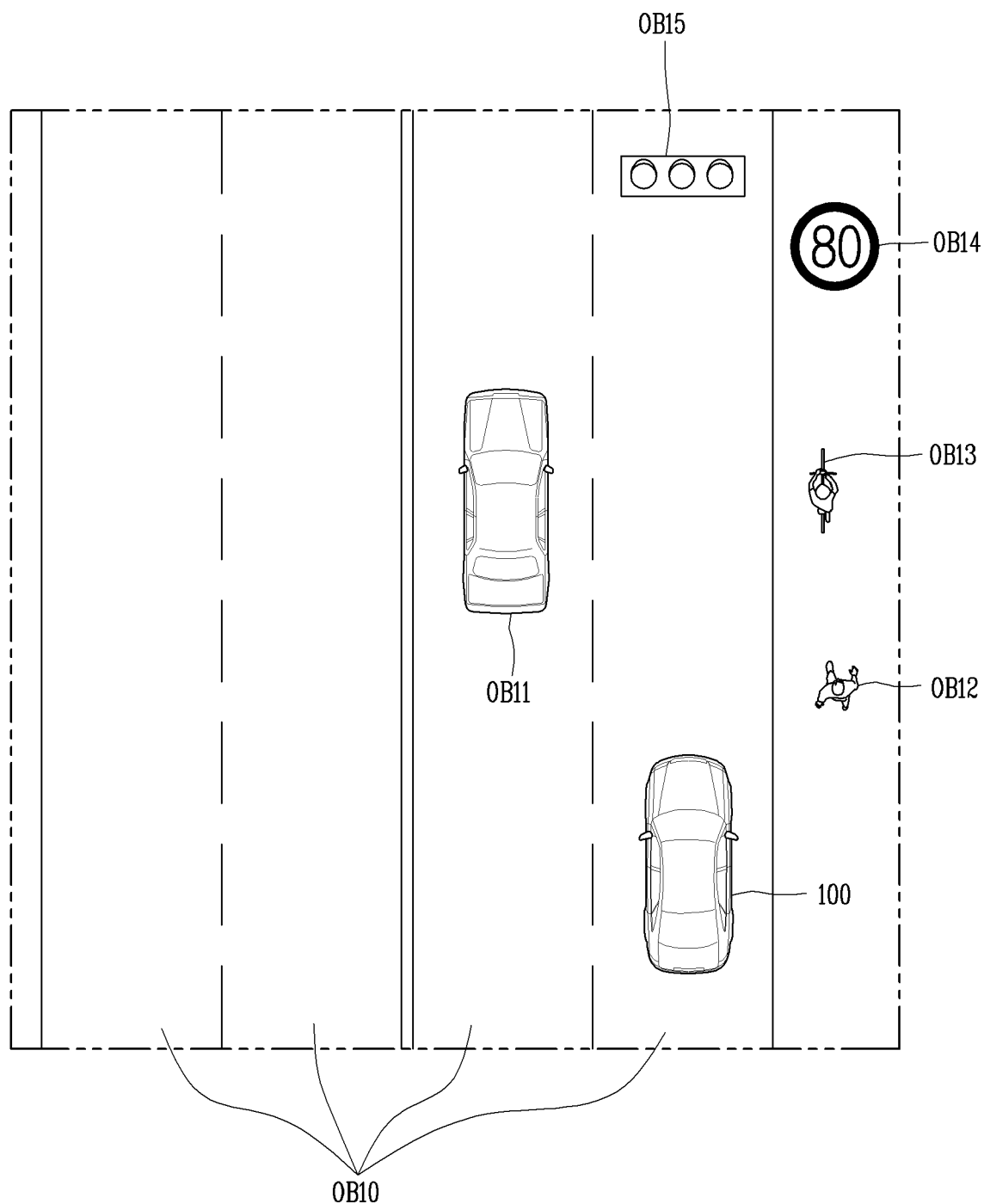
FIGS. 5 and 6 are diagrams referenced to describe objects.

Referring to FIGS. 5 and 6, an object O may include (traffic) lanes OB10, another vehicle OB11, a pedestrian OB12, a two-wheeled vehicle OB13, traffic signals OB14 and OB15, light, a road, a structure, a speed bump, a terrain, an animal, and other objects.

The lane OB10 may be a driving lane, a lane next to the driving lane, or a lane on which another vehicle comes in an opposite direction to the vehicle 100. Each lane OB10 may include left and right lines forming the lane.

The vehicle OB11 may be a vehicle which is traveling near the vehicle 100. The vehicle OB11 may be a vehicle located within a predetermined distance from the vehicle 100. For example, the vehicle OB11 may be a vehicle travelling ahead of or behind the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light generated from a lamp provided at another vehicle. The light may be light generated from a streetlamp. The light may be solar light.

The road may include a road surface, a curve, an upward slope, a downward slope, and the like.

The structure may be an object that is located near a road and fixed on the ground. For example, the structure may include a streetlamp, a roadside tree, a building, an electric pole, a traffic light, a bridge, and the like.

The terrain may include a mountain, a hill, and the like.

In some implementations, objects may be classified into a moving object and a fixed object. For example, the moving object may include another vehicle and a pedestrian. The fixed object may include, for example, a traffic signal, a road, or a structure.

Referring to FIG. 7 the object detecting apparatus 300 may include a camera 310, a radar 320, a LiDAR 330, an ultrasonic sensor 340, an infrared sensor 350, and at least one processor such as a processor 370.

In some implementations, the object detecting apparatus 300 may further include other components in addition to the components described herein, or may exclude one or more of the components described herein.

Figure 2:
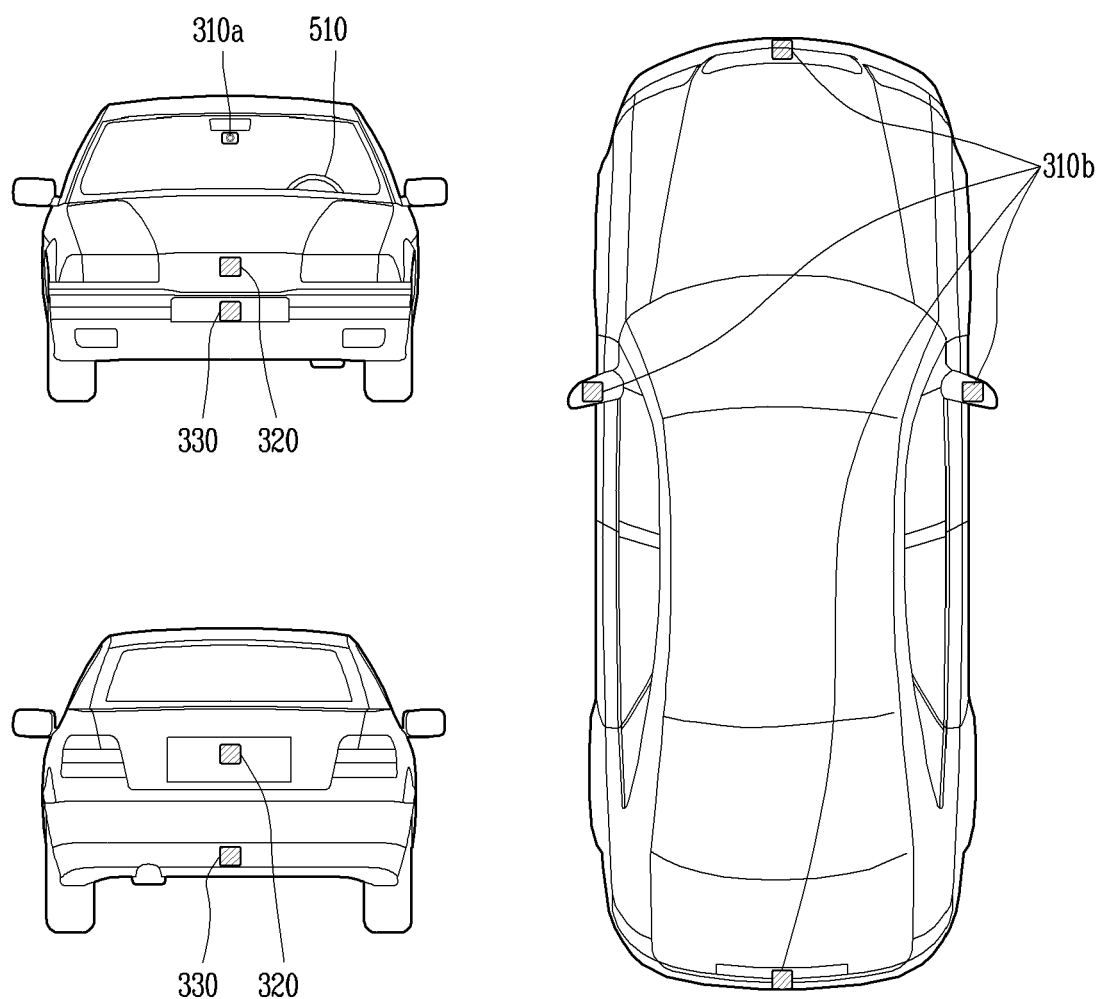
FIG. 2 illustrates a vehicle exterior from various angles.

The camera 310 may be located on an appropriate portion outside the vehicle to acquire an external image of the vehicle. The camera 310 may be a mono camera, a stereo camera 310a (as depicted in FIGS. 1 and 2), an around view monitoring (AVM) camera 310b (as depicted in FIG. 2) or a 360-degree camera.

In some implementations, the camera 310 may be disposed adjacent to a front windshield within the vehicle to acquire a front image of the vehicle. Alternatively or in addition, the camera 310 may be disposed adjacent to a front bumper or a radiator grill.

Alternatively or in addition, the camera 310 may be disposed adjacent to a rear glass within the vehicle to acquire a rear image of the vehicle. Alternatively or in addition, the camera 310 may be disposed adjacent to a rear bumper, a trunk or a tail gate.

Alternatively or in addition, the camera 310 may be disposed adjacent to at least one of side windows within the vehicle to acquire a side image of the vehicle. Alternatively or in addition, the camera 310 may be disposed adjacent to a side mirror, a fender, or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position (or location) of the detected object, a distance from the detected object and a relative speed with the detected object.

The radar 320 may be disposed on an appropriate position outside the vehicle for detecting an object which is located at a front, rear, or side of the vehicle as depicted in FIG. 2.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear, or side of the vehicle as depicted in FIG. 2.

The ultrasonic sensor 340 may include ultrasonic wave transmitting and receiving portions. The ultrasonic sensor 340 may detect an object based on an ultrasonic wave, and detect a position of the detected object, a distance from the detected object, and a relative speed with the detected object.

The ultrasonic sensor 340 may be disposed on an appropriate position outside the vehicle for detecting an object located at the front, rear, or side of the vehicle.

The infrared sensor 350 may include infrared light transmitting and receiving portions. The infrared sensor 350 may detect an object based on infrared light, and detect a position of the detected object, a distance from the detected object, and a relative speed with the detected object.

The infrared sensor 350 may be disposed on an appropriate position outside the vehicle for detecting an object located at the front, rear, or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave, which is generated when an emitted electromagnetic wave is reflected from the object, and track the object. The processor 370 may execute operations, such as a calculation of a distance from the object, a calculation of a relative speed with the object, and the like, based on the reflected electromagnetic wave.

The processor 370 may detect an object based on a reflected laser beam, which is generated when an emitted laser beam is reflected from the object, and track the object. The processor 370 may execute operations, such as a calculation of a distance from the object, a calculation of a relative speed with the object, and the like, based on the reflected laser beam.

The processor 370 may detect an object based on a reflected ultrasonic wave, which is generated when an emitted ultrasonic wave is reflected from the object, and track the object. The processor 370 may execute operations, such as a calculation of a distance from the object, a calculation of a relative speed with the object, and the like, based on the reflected ultrasonic wave.

The processor 370 may detect an object based on reflected infrared light, which is generated when emitted infrared light is reflected from the object, and track the object. The processor 370 may execute operations, such as a calculation of a distance from the object, a calculation of a relative speed with the object, and the like, based on the reflected infrared light.

According to some implementations, the object detecting apparatus 300 may include a plurality of processors 370 or does not include the processor 370. In some implementations, each of the camera 310, the radar 320, the LiDAR 330, the ultrasonic sensor 340, and the infrared sensor 350 may include a processor in an individual manner.

When the processor 370 is not included in the object detecting apparatus 300, the object detecting apparatus 300 may operate according to the control of a processor of an apparatus within the vehicle 100 or the controller 170.

Referring to FIG. 7, the object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to some implementations, the communication apparatus 400 may further include other components in addition to the components described herein, or may exclude one or more of the components described herein.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communication with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V), and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to some implementations, the communication apparatus 400 may include a plurality of processors 470 or does not include the processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

In some implementations, the communication apparatus 400 may operate according to the control of the controller 170.

Referring still to FIG. 7, the driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530, and a brake input device 570.

The steering input device 510 may receive an input regarding a driving (proceeding) direction of the vehicle 100 from the user. The steering input device 510 may refer to a wheel allowing a steering input in a rotating manner. According to some implementations, the steering input device 510 may also refer to a touch screen, a touch pad, or a button.

The acceleration input device 530 may receive an input for accelerating the vehicle 100 from the user. The brake input device 570 may receive an input for braking the vehicle 100 from the user. Each of the acceleration input device 530 and the brake input device 570 may refer to a pedal. According to some implementations, the acceleration input device 530 or the brake input device 570 may also refer to a touch screen, a touch pad, or a button.

In some implementations, the driving control apparatus 500 may operate according to the control of the controller 170.

Referring still to FIG. 7, the vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include a processor. Alternatively or in addition, each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

In other example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N), or parking (P).

For example, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622, and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce a speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

Referring still to FIG. 7, the safety apparatus operating unit 640 may perform an electronic control for various safety apparatuses within the vehicle 100.

The safety apparatus operating unit 640 may include an airbag operating portion 641, a seatbelt operating portion 642, and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, and 110RR (depicted in FIG. 4) using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

Referring still to FIG. 7, the lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

In some implementations, the vehicle operating apparatus 600 may include a processor. Each unit of the vehicle operating apparatus 600 may individually include a processor.

In some embodiments, the vehicle operating apparatus 600 may operate according to the control of the controller 170.

Referring still to FIG. 7, the operation system 700 is a system that controls various driving (or drive) modes of the vehicle 100. The operation system 700 may operate in an autonomous driving mode.

The operation system 700 may include a driving system 710, a parking exit system 740, and a parking system 750.

According to implementations, the operation system 700 may further include other components in addition to the components described herein, or may exclude one or more of the components described herein.

In some embodiments, the operation system 700 may include at least one processor. Alternatively or in addition, each unit of the operation system 700 may individually include at least one processor.

According to some implementations, the operation system 700 may be implemented by the controller 170 when it is implemented in a software configuration.

In some implementations, the operation system 700 may include at least one of the user interface apparatus 200, the object detecting apparatus 300, the communication apparatus 400, the vehicle operating apparatus 600, or the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600, and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information, and current location information of the vehicle 100.

The navigation system 770 may include a memory and a processor. The memory may store the navigation information. The processor may control an operation of the navigation system 770.

According to some implementations, the navigation system 770 may update stored information by receiving information from an external device through the communication apparatus 400.

According to some implementations, the navigation system 770 may be classified as a sub component of the user interface apparatus 200.

The sensing unit 120 may detect a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal, and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some embodiments, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive, and the like in a hardware configuration. The memory 140 may store various data for overall operations of the vehicle 100, such as programs for processing or controlling the controller 170.

According to some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 according to the present disclosure may include a display device 800.

The display device 800 may control at least one of those components illustrated in FIG. 7. From this perspective, the display device 800 may be the controller 170.

Without a limit to this, the display device 800 may be a separate device, independent of the controller 170. When the display device 800 is implemented as a component independent of the controller 170, the display device 800 may be provided on a part of the vehicle 100.

Hereinafter, description will be given of implementations in which the display device 800 is a component which is separate from the controller 170, for the sake of explanation. As such, according to implementations described in this disclosure, the functions (operations) and control methods described in relation to the display device 800 may be executed by the controller 170 of the vehicle. That is, every detail described in relation to the display device 800 may be applied to the controller 170 in the same/like manner.

Also, the display device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, a display device and a control method thereof according to the present disclosure will be described in detail with reference to the accompanying drawings.

Figure 8:
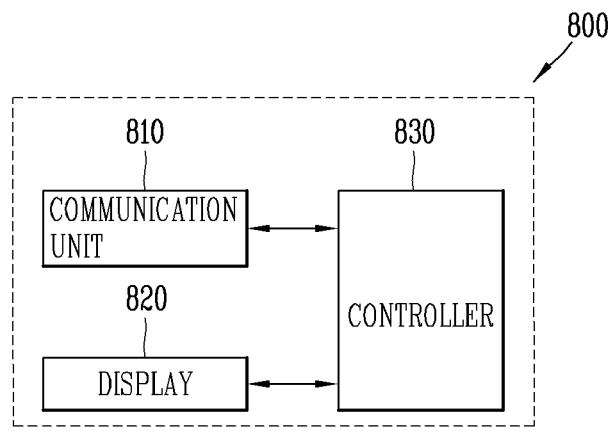
FIG. 8 is a block diagram of an example display device.

FIG. 8 is a block diagram of an example display device 800.

Referring to FIG. 8, the display device 800 is provided in the vehicle 100, and includes a communication unit 810, a display 820, and a controller (or control unit) 830.

The communication unit 810 may receive vehicle driving information. For example, the communication unit 810 may receive the vehicle driving information from one or more processors provided in the vehicle 100.

In detail, the communication unit 810 may receive driving information regarding the vehicle 100 from most of the devices provided in the vehicle 100. The information transmitted from the vehicle 100 to the display device 800 is referred to as 'vehicle driving information (or vehicle travel information)'.

Vehicle driving information includes vehicle information and surrounding information related to the vehicle. Information related to the inside of the vehicle with respect to the frame of the vehicle 100 may be defined as the vehicle information, and information related to the outside of the vehicle may be defined as the surrounding information.

The vehicle information refers to information related to the vehicle 100 itself. For example, the vehicle information may include a driving speed, a driving direction, an acceleration, an angular velocity, a location (GPS), a weight, the number of passengers on board the vehicle, a braking force of the vehicle, a maximum braking force, air pressure of each wheel, a centrifugal force applied to the vehicle, a driving (or drive) mode of the vehicle (autonomous driving mode or manual driving mode), a parking mode of the vehicle (autonomous parking mode, automatic parking mode, manual parking mode), fuel efficiency, the remaining fuel amount (or fuel level), whether or not a user is present in the vehicle, and information associated with the user.

The surrounding information refers to information related to another object located within a predetermined range around the vehicle 100, and information related to the outside of the vehicle 100. The surrounding information of the vehicle may be a state of a road surface on which the vehicle is traveling (e.g., a frictional force), the weather, a distance from the preceding (or following) vehicle, a relative speed of the preceding (or following) vehicle, a curvature of a curve when a driving lane is the curve, information associated with an object existing in a reference area or region (predetermined area) based on the vehicle, whether an object enters or leaves the predetermined region, whether or not the user exists near the vehicle, information associated with the user (e.g., whether or not the user is an authenticated user), and the like.

The surrounding information may include ambient brightness, a temperature, a position of the sun, information related to nearby subjects (a person, another vehicle, a sign, etc.), a type of a driving road surface, a landmark, (traffic) line information, and driving lane information, and information required for a driving or parking mode (autonomous driving/autonomous parking/automatic parking/manual parking mode).

In addition or alternatively, the surrounding information may further include a distance from an object nearby to the vehicle 100, collision possibility, a type of the object, a parking space available for the vehicle, an object for identifying the parking space (e.g., a parking line, a string, another vehicle, a wall, etc.), and the like.

More specifically, the surrounding information may further include information regarding the surrounding traffic situation, information about accident/construction areas, and the like.

The vehicle driving information is not limited to the examples described above and may include all information generated from the components provided in the vehicle 100.

The display 820 may output various information under the control of the controller 830 provided in the display device 800. For example, the display 820 may output a specific light beam for visual information. The visual information may be related to the aforementioned vehicle driving information.

In addition or alternatively, the display 820 may output a speedometer. Further, a needle for indicating the current speed of the vehicle 100 may be displayed on the speedometer.

In some implementations, the display 820 may be implemented as a (instrument) cluster provided at the driver's seat.

The controller 830 may calculate a speed range to be recommended (or suggested) according to a preset or predetermined condition based on the received vehicle driving information, and control the display 820 such that a graphic object indicating the calculated speed range is displayed on the speedometer. Here, the calculated speed range may differ according to the vehicle driving information.

The predetermined condition (recommended mode) may be set based on one or more of the received vehicle driving information.

That is, an optimal speed range may be suggested by combining various surrounding environment information. Accordingly, the predetermined condition may be referred to as a 'recommended mode' or 'recommended criterion'.

In some implementations, the speed range may be calculated based on traffic signal information on a driving road. Alternatively, the speed range may be calculated based on speed limit information of the driving road.

In some implementations, an object indicating the predetermined condition (recommended mode) may be output to the display 820. In detail, an icon may be displayed on a position adjacent to the speedometer.

In some implementations, the icon may be displayed as an icon representing a source of information acquisition. In detail, it may be displayed as an icon indicating at least one of a camera, radar, LiDAR, map data, and external connection information (V2X).

The speed range may be calculated as a range having a minimum value and a maximum value. In addition or alternatively, the speed range may be divided into several sections having meaning to be displayed.

In some implementations, the speed range may include a first speed range and a second speed range, and each of the speed ranges may be displayed as a first graphic object and a second graphic object, respectively.

The graphic object may be displayed in various colors, positions, shapes, and thicknesses according to the speed range. For example, the graphic object having a stripe (or bar) shape may be displayed on the rim (or edge) of the speedometer.

Figure 9:
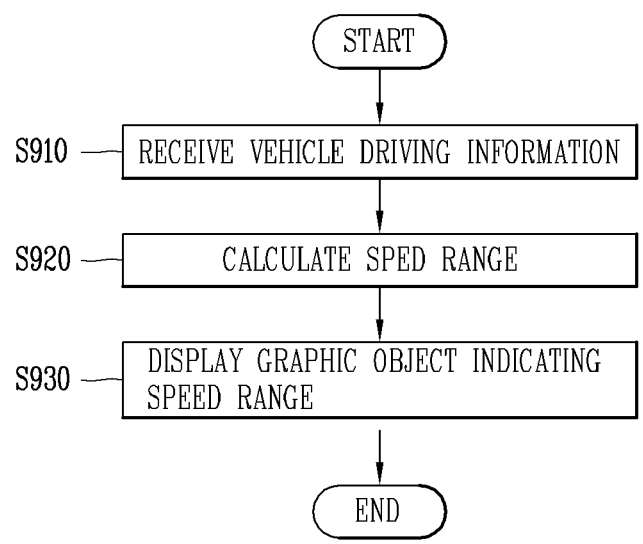
FIG. 9 is a flowchart of an example control method of the display device of FIG. 8.

FIG. 9 is a flowchart of an example control method of the display device 800.

Referring to FIG. 9, the control method of the display device is a method of controlling the display device 800 provided in the vehicle 100 and configured to control the display 820 displaying a speedometer. First, vehicle driving information is received (S910).

As described above, the vehicle driving information includes vehicle information and surrounding information of the vehicle. Information related to the inside of the vehicle with respect to the frame of the vehicle 100 may be defined as the vehicle information, and information related to the outside of the vehicle may be defined as the surrounding information.

Subsequently, a speed range to be recommended is calculated according to a predetermined condition based on the received vehicle driving information (S920).

The predetermined condition may be set based on one or more of the received vehicle driving information.

That is, an optimal speed range may be recommended by combining various surrounding environment information. Accordingly, the predetermined condition may be referred to as a 'recommended mode' or 'recommended criterion'.

Then, a graphic object indicating the calculated speed range is displayed on the speedometer (S930).

Here, the calculated speed range may vary according to the vehicle driving information.

In some implementations, calculating the speed range (S920) may include a step of calculating the speed range based on traffic signal information on a driving road.

In detail, when approaching a predetermined area and there is a traffic light ahead of the vehicle 100, the speed range may include at least one of a first speed range to keep driving without stopping for entering the predetermined area according to a 'proceed (or go)' signal of the traffic light, a second speed range to stop according to a 'preliminary (or prepare to stop)' signal of the traffic light, and a third speed range to stop according to a 'stop' signal of the traffic light.

In some implementations, the controller 830 may calculate the speed range based on traffic signal information on the driving road.

In some implementations, when approaching a predetermined area and there is a traffic light ahead of the vehicle 100, the speed range may include at least one of a first speed range to keep driving without stopping for entering the predetermined area according to a 'proceed (or go)' signal of the traffic light, a second speed range to stop according to a 'preliminary (or prepare to stop)' signal of the traffic light, and a third speed range to stop according to a 'stop' signal of the traffic light.

In some implementations, the graphic object may include a first graphic object corresponding to the first speed range, a second graphic object corresponding to the second speed range, and a third graphic object corresponding to the third speed range.

Here, the second graphic object may be an image having a predetermined color, and the predetermined color may vary according to a position of the vehicle.

Figure 10:
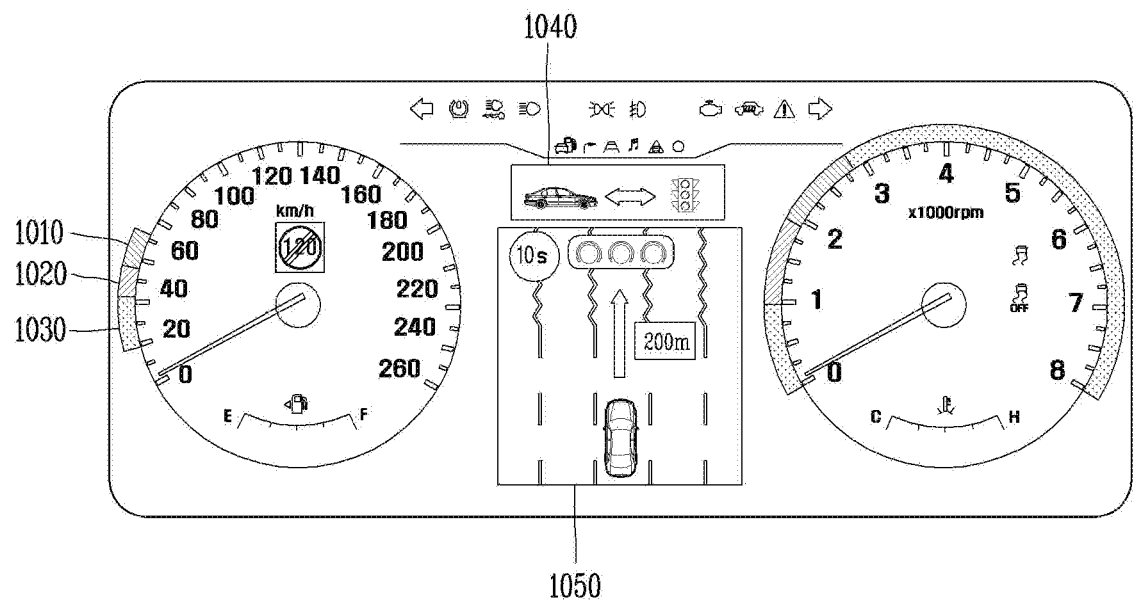
FIG. 10 is a diagram illustrating an exemplary display of graphic object indicating a speed range calculated based on traffic signal information on a driving road is output.

FIG. 10 is a diagram illustrating an exemplary display of graphic object indicating a speed range calculated based on traffic signal information on a driving road is output.

Referring to FIG. 10, when approaching a predetermined area and there is a traffic light ahead of the vehicle 100, a speed range may be calculated. The calculated speed range may include at least one of a first speed range to keep driving without stopping for entering the predetermined area according to a 'proceed signal (blue or green light)' of the traffic light, a second speed range to stop according to a 'preliminary signal (yellow or orange light)' of the traffic light, and a third speed range to stop according to a 'stop signal (red light)' of the traffic light.

Each of the speed ranges may be displayed as a stripe (or bar) on the rim (or edge) of the speedometer. In an exemplary embodiment, a first graphic object 1010 corresponding to the first speed range, a second graphic object 1020 corresponding to the second speed range, and a third graphic object corresponding to the third speed range 1030 may be displayed.

Here, the graphic objects 1010, 1020, and 1030 may be displayed in different colors, shapes, and sizes at different positions of the speedometer. For example, considering a color of the corresponding traffic light, the first graphic object 1010, the second graphic object 1020, and the third graphic object 1030 may be displayed in green, yellow, and red, respectively.

In addition or alternatively, the speed ranges may be calculated within a speed range that actually allows the vehicle 100 to travel by taking into consideration of the speed of other vehicles nearby, the traffic volume on the road, and the like.

In some implementations, an icon indicating the current recommended mode (the predetermined condition) may be output to a position adjacent to the speedometer. In detail, an icon 1040 indicating that the current recommended mode is based on traffic light information may also be displayed next to the speedometer.

In addition or alternatively, information 1050 regarding the remaining distance to a traffic light from the vehicle 100, current traffic light information, and an estimated time for a traffic signal to change may also be output to the cluster.

As described above, the graphic object may be an image having a predetermined color. The predetermined color may vary according to a location of the vehicle 100.

In some implementations, since a color of the preliminary signal (prepare to stop signal) is differently defined for each country, the color (yellow, orange, or the like) of the graphic object indicating the preliminary signal based on the current location of the vehicle 100 may vary.

In some implementations, the speed ranges may include a speed value equal to or greater than a first speed value and equal to or less than a second speed value. Based on a difference between the second speed value and the first speed value, the controller 830 may control the display 820 such that at least one of a minimum value, a maximum value, and a unit interval of speed (or speed value interval) corresponding to a graduation interval of the speedometer is changed.

In some implementations, when the difference between the second speed value and the first speed value is equal to or less than a predetermined value, the controller 830 may control the display 820 such that the maximum value of the speedometer is decreased to a predetermined value.

Figure 11:
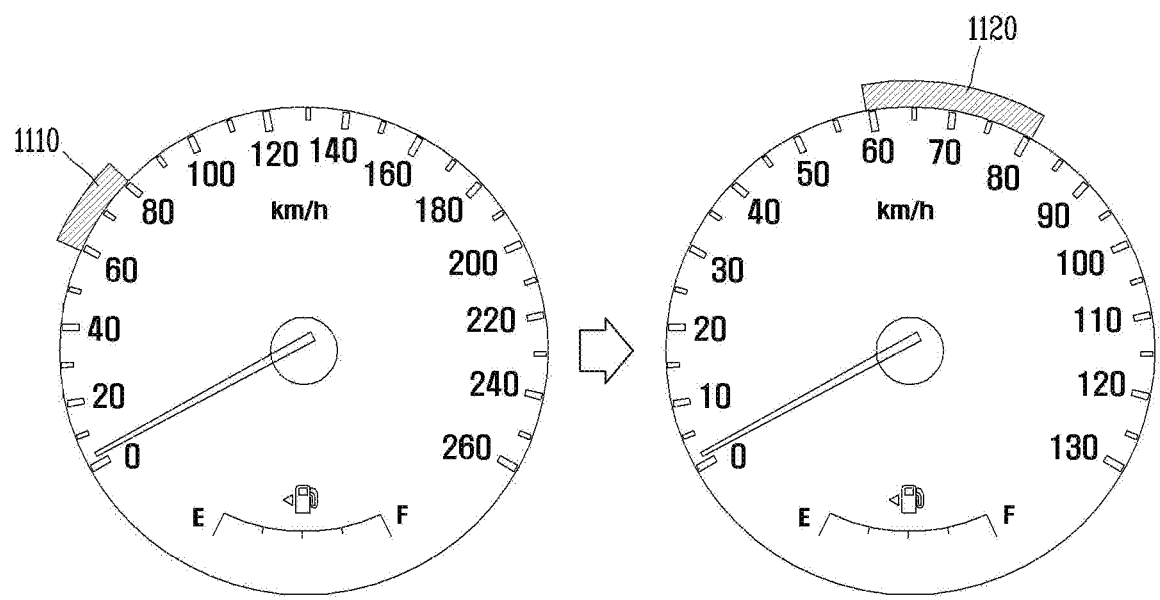
FIG. 11 is a diagram illustrating an exemplary display of graphic object which a maximum speed value of a speedometer is changed.

FIG. 11 is a diagram illustrating an exemplary display of graphic object which a maximum speed value of a speedometer is changed.

Referring to FIG. 11, a calculated speed range may be a first speed value (60 km/h) to a second speed value (80 km/h). Here, a difference in value between the first and second speed values is 20 km/h.

When the speed value difference (speed value interval) is less than (or smaller) than a predetermined level, a maximum value of the speedometer may be changed to a predetermined value so as to be enlarged and displayed on the speedometer.

In some implementations, a graphic object 1110 indicating the speed range when a maximum value of the speedometer is 260 km/h, and a graphic object 1120 indicating the speed range when a maximum value of the speedometer is 130 km/h may be displayed in different positions and sizes on the speedometer.

In some implementations, as the maximum value of the speedometer is changed as described above, a unit interval of speed corresponding to a speedometer graduation interval may also be changed. For example, when the maximum value of the speedometer is changed from 260 km/h to 130 km/h as shown in FIG. 11, the unit interval of speed corresponding to the speedometer graduation interval may be changed from 10 km/h to 5 km/h.

That is, when the speed value difference (speed value interval) is less than (or smaller) than a predetermined level, the maximum value of the speedometer may be decreased (by changing the unit interval of speed corresponding to the speedometer graduation interval), so that the graphic object indicating the speed range is enlarged and displayed on the speedometer.

In some implementations, when the difference between the second speed value and the first speed value is equal to or less than a predetermined value, the controller 830 may control the display 820 such that a unit interval of speed in one region of the speedometer corresponding to the speed range is decreased to a predetermined value.

Figure 12:
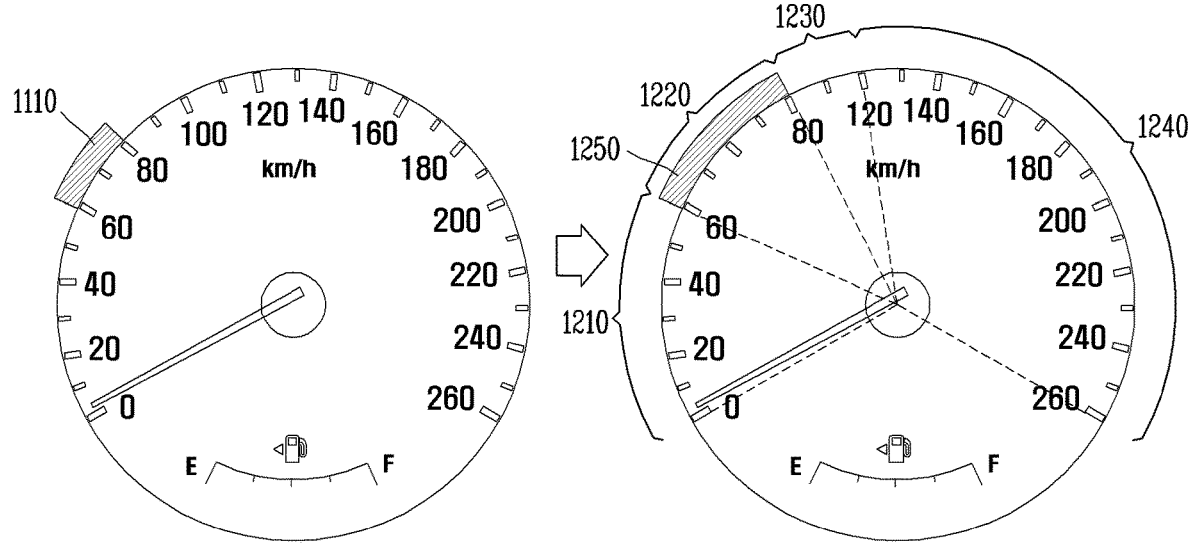
FIG. 12 is a diagram illustrating an exemplary display of graphic object which a unit interval of speed corresponding a graduation interval of a speedometer is changed.

FIG. 12 is diagram illustrating an exemplary display of graphic object which a unit interval of speed corresponding to a speedometer graduation interval is changed.

Referring to FIG. 12, a unit interval of speed corresponding to a graduation interval of the speedometer may be set to 10 km/h for a first region 1210 and a fourth region 1240, 5 km/h for a second region 1220, and 20 km for a third region 1230.

That is, as the unit interval of speed in the second region 1220 of the speedometer that corresponds to the speed range is set to 5 km/h, a graphic object 1250 indicating the speed range may be enlarged and displayed on the speedometer.

In some implementations, when the difference in value between the second speed value and the first speed value is equal to or less than a predetermined value, the controller 830 may control the display 820 such that one region of the speedometer that corresponds to the speed range is enlarged to be displayed.

Figure 13:
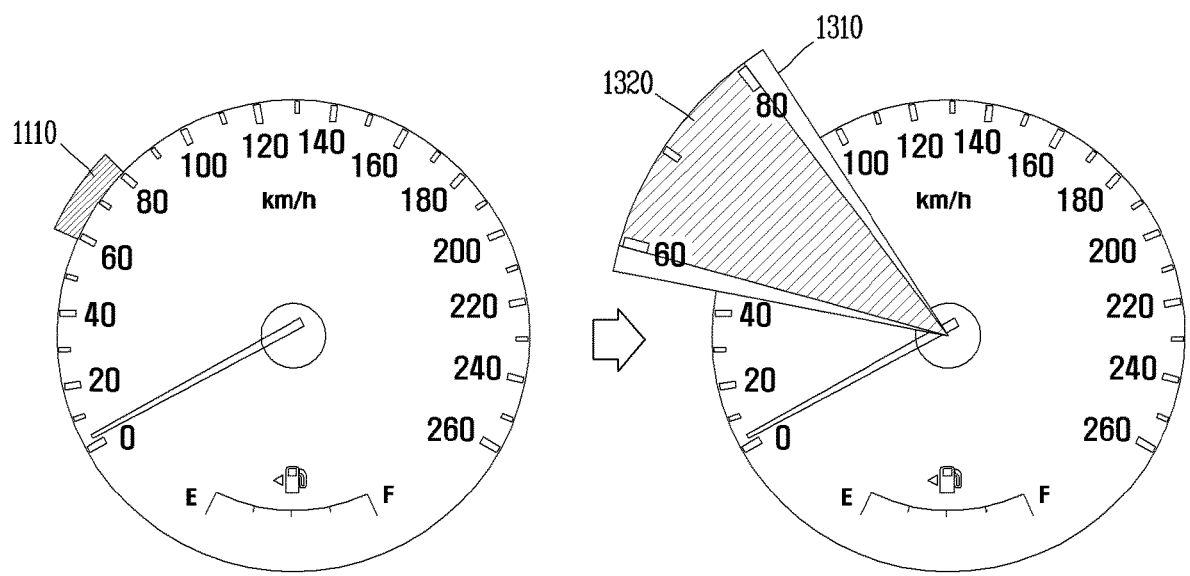
FIG. 13 is a diagram illustrating an exemplary display of graphic object which one region is enlarged.

FIG. 13 is a diagram illustrating an exemplary display of graphic object which one region of a speedometer is enlarged.

Referring to FIG. 13, one region 1310 of the speedometer indicating a speed range of 60 km/h to 80 km/h may be enlarged and displayed as a pop-up on the speedometer. Accordingly, a graphic object 1320 indicating the speed range may also be enlarged and displayed.

According to the embodiments of FIGS. 11 to 13, when the difference in value between (two) speed values (speed value intervals) is less than (or smaller) than a predetermined level, the maximum value of the speedometer may be reduced (by adjusting the unit interval of speed corresponding to the speedometer graduation interval). Alternatively, a unit interval of speed in one region of the speedometer may be reduced, or one region of the speedometer may be enlarged and displayed.

As a result, a graphic object indicating the speed range is enlarged and displayed on the speedometer, thereby improving convenience of driver.

The embodiments of FIGS. 11 to 13 are exemplary embodiments. In order for a graphic object indicating the speed range is enlarged and displayed on the speedometer, the method for outputting the speedometer may be changed in various manners.

For example, an unnecessary portion of the speed value, due to changes in the minimum value of the speedometer, may be omitted. Accordingly, the speed range may be displayed in a wider region.

In some implementations, when the vehicle 100 is not travelling within the calculated speed range for a predetermined time, the controller 830 may control the communication unit 810 to output a notification.

In detail, when the vehicle 100 is not travelling within the calculated speed range for a predetermined time, at least one of visual, tactile, and audible notifications may be output.

In some implementations, a flashing or blinking image may be output to a graphic object indicating the speed range, or a color, shape, size, and output position of the graphic object may be changed to call attention of the driver.

In another example, a message warning that the vehicle is not traveling within the speed range may be displayed in a pop-up window. Alternatively, the message may be output by voice.

In another example, a specific amount of vibration may be provided to the driver's seat or the steering wheel along with the voice message.

In some implementations, when the vehicle 100 is not travelling within the calculated speed range for a predetermined time, the display 820 may be controlled such that the output of the graphic object is terminated.

More specifically, a speed range may be calculated in consideration of fuel efficiency, and a graphic object corresponding to the calculated speed range may be displayed on the speedometer. However, when the vehicle 100 is not travelling within the calculated speed range for a predetermined time, the output of the graphic object may be cleared from the speedometer. That is, the output of the graphic object may be terminated considering energy-efficiency.

In some implementations, when the vehicle 100 is not travelling within the speed range for a predetermined time, the speed range may be recalculated by the controller 830. The controller 830 may control the display 820 such that at least one of a size and a position of the graphic object is changed according to the recalculated speed range.

Figure 14:
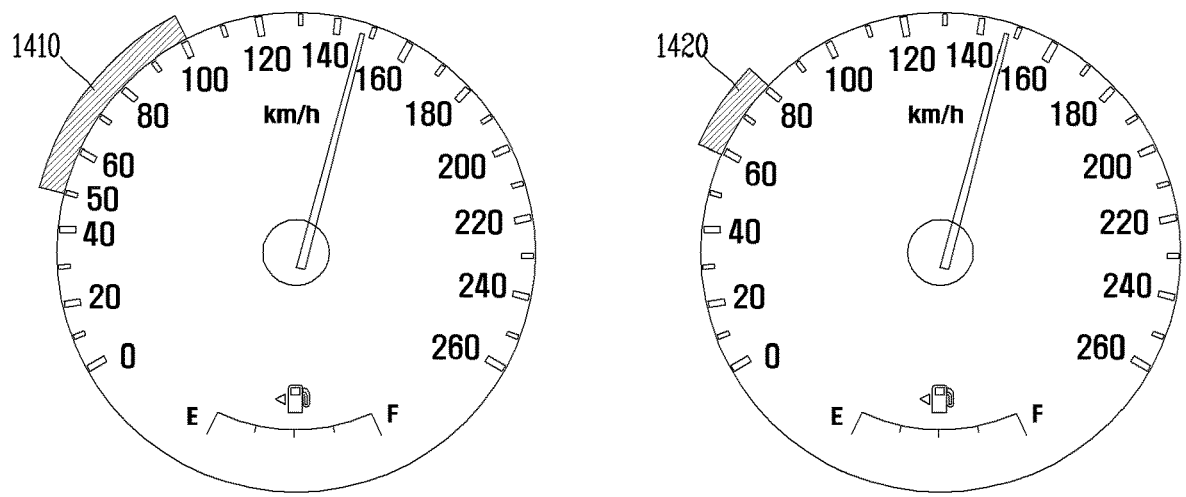
FIG. 14 is a diagram illustrating an exemplary display of graphic object indicating a speed range is changed based on a recalculated speed range.

FIG. 14 is a diagram illustrating an exemplary display of graphic object indicating a speed range is changed based on a recalculated speed range.

Referring to FIG. 14, a speed range is calculated as 50 km/h to 100 km/h, and a graphic object 1410 corresponding to the speed range may be displayed on the speedometer.

Thereafter, when the vehicle 100 is not travelling within the speed range of 50 km/h to 100 km/h for a predetermined time, the speed range may be calculated again.

In some implementations, the speed range may be recalculated as 60 km/h to 80 km/h, and a graphic object 1420 corresponding to this may be displayed on the speedometer. Here, a size and position of the graphic object may be changed according to a recalculated speed range.

In some implementations, when the speed range is recalculated, driving habits of the driver, driving history of the vehicle, car accident history, and the driver's current state, and the like may be considered.

In detail, when the driver usually drives fast, the speed range may be adjusted (recalculated) to a range less than the calculated speed range, and a graphic object corresponding to the adjusted range may be provided.

In some implementations, as described above, the vehicle driving information includes information related to the driver. Accordingly, when calculating a speed range, driving habits of the driver, driving history of the vehicle, car accident history, and the driver's current state, and the like may be considered.

In other words, information related to the driver is not considered only for when the vehicle 100 is not travelling within the speed range for a predetermined time.

In some implementations, the controller 830 may calculate the speed range based on speed limit information of a driving road.

Figure 15:
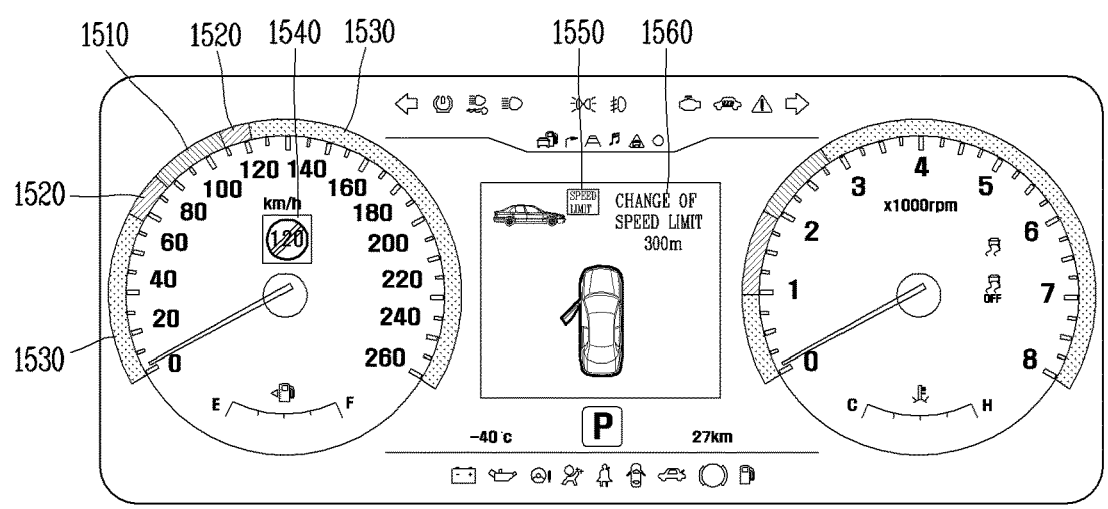
FIG. 15 is a diagram illustrating an exemplary display of graphic object indicating a speed range calculated based on a speed limit of a driving road is output.

FIG. 15 is a diagram illustrating an exemplary display of graphic object indicating a speed range calculated based on a speed limit of a driving road is output.

Referring to FIG. 15, a speed range may be calculated based on speed limit information of a driving road, and graphic objects corresponding to the calculated speed range may be displayed as stripes (or bars) on the rim (or edge) of the speedometer. Here, each of the graphic objects may be displayed in different colors, shapes, sizes, and the like at different positions.

In some implementations, a first speed range which is preferentially recommended (or recommended the most) by taking the maximum speed limit and the minimum speed limit of the driving road into consideration, and a second speed range that does not interfere with driving but is not preferentially recommended (second-best), and a third speed range which is not recommended may be calculated.

Here, the speed limit information of the driving road may be obtained from map data, or an image sensor (camera, etc.) of the vehicle 100.

Accordingly, a first graphic object 1510 corresponding to the first speed range, second graphic objects 1520 corresponding to the second speed range, and third graphic objects 1530 corresponding to the third speed range may be displayed as stripes (or bars) with different colors on the rim (or edge) of the speedometer.

In some implementations, an icon 1540 indicating the maximum speed limit or the minimum speed limit of the driving road may be displayed on the speedometer.

In some implementations, an icon indicating the current recommended mode (the predetermined condition) may be output to a position adjacent to the speedometer. In detail, an icon 1550 indicating that the current recommended mode is based on the speed limit of the driving road may also be displayed next to the speedometer.

In addition or alternatively, in case a speed limit is changed, information 1560 notifying when the speed limit is changed (e.g., 300*m* ahead) may also be output to the cluster.

In some implementations, the controller 830 may calculate the speed range based on driving mode information set in the vehicle 100.

The driving mode may include various modes in consideration of driving conditions such as an eco-mode, a comfort mode, a sports mode, and a cruise mode, etc.

Figure 16:
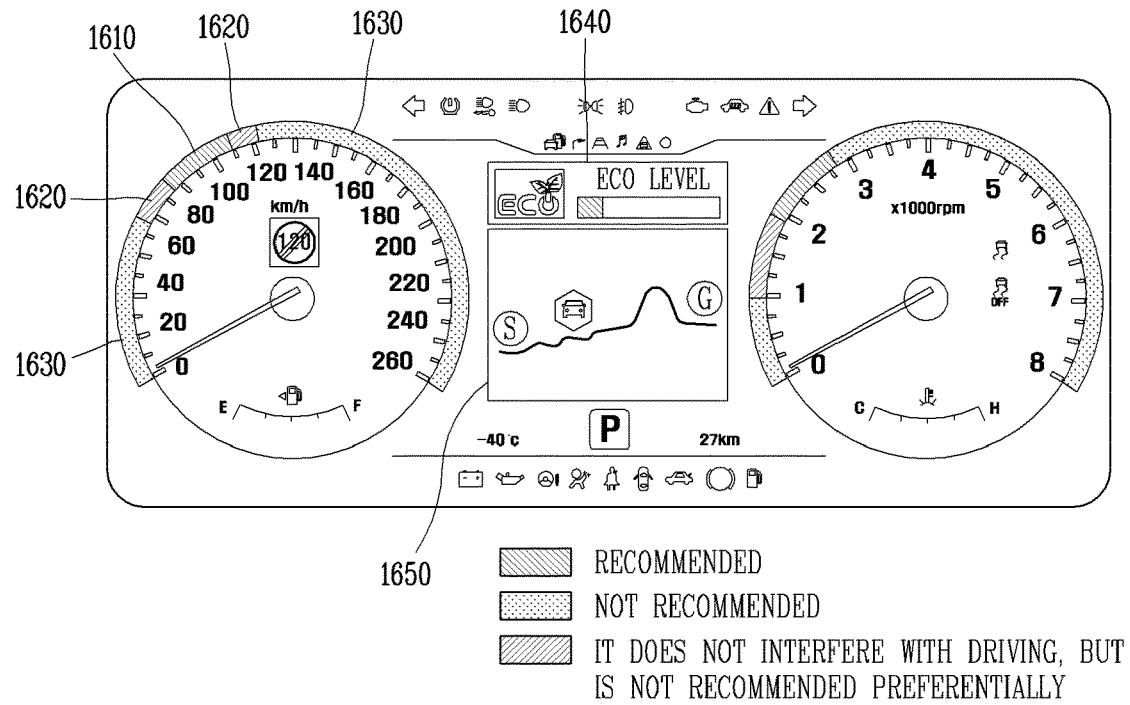
FIG. 16 is a diagram illustrating an exemplary display of graphic object indicating a speed range calculated based on a driving mode set in a vehicle is output.

FIG. 16 is a diagram illustrating an exemplary embodiment in which a graphic object indicating a speed range calculated based on a driving mode set in a vehicle is output.

Referring to FIG. 16, a speed range may be calculated based on an echo level set in the vehicle 100, and graphic objects corresponding to the calculated speed range may be displayed as stripes (or bars) on the rim (edge) of the speedometer. Here, each of the graphic objects may be displayed in different colors, shapes, sizes, and the like at different positions.

The eco level may be defined as a level (or degree) of fuel savings for the vehicle in the eco-mode, which is a fuel-efficient driving mode.

In some implementations, based on the set eco level, a first speed range which is the most recommended speed range, a second speed range which is the second-best recommended speed range, and a third speed range which is not recommended may be calculated.

Accordingly, a first graphic object 1610 corresponding to the first speed range, second graphic objects 1620 corresponding to the second speed range, and third graphic objects 1630 corresponding to the third speed range may be displayed as stripes (or bars) with different colors on the rim (or edge) of the speedometer.

In some implementations, an icon indicating the current recommended mode (the predetermined condition) may be output to a position adjacent to the speedometer. In detail, an icon 1640 indicating that the current recommended mode is based on the echo level may also be displayed next to the speedometer.

In addition or alternatively, road slope information 1650 according to a navigation guide route may be output to the cluster. The road slope information 1650 may also include a departure location, a destination, a current location of the vehicle, and eco-driving state information (color-coded).

In some implementations, the controller 830 may calculate the speed range based on information regarding a predetermined safe distance from another vehicle.

Figure 17:
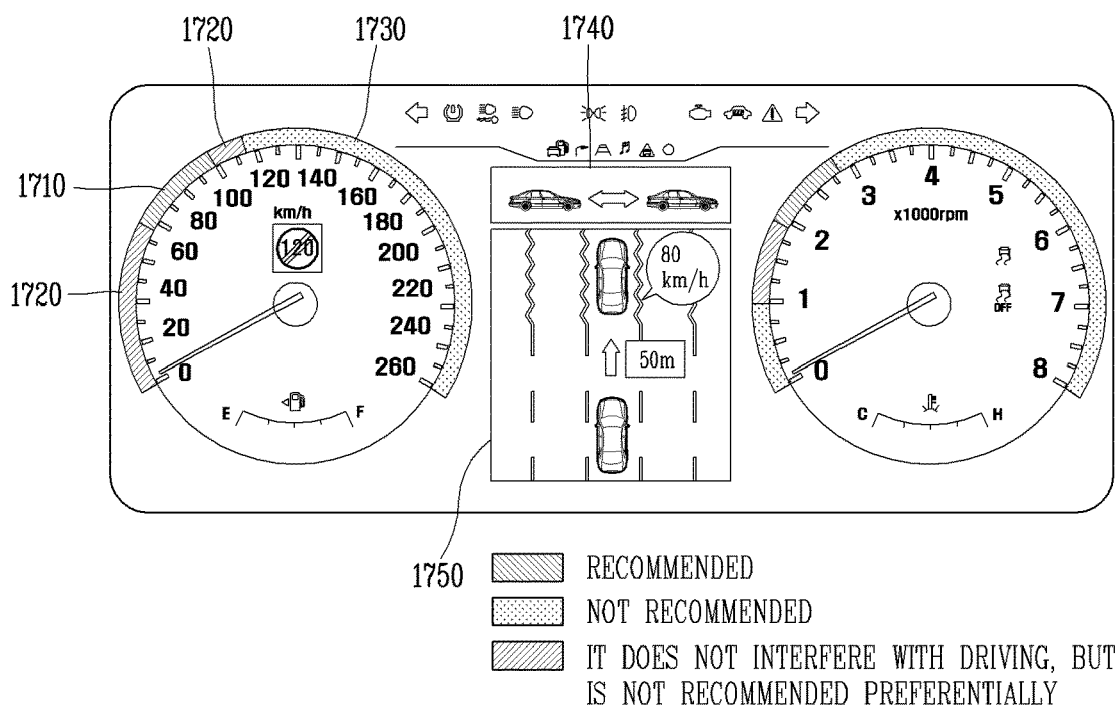
FIG. 17 is a diagram illustrating an exemplary display of graphic object indicating a speed range calculated for maintaining a safe distance from another vehicle is output.

FIG. 17 is a diagram illustrating an exemplary display of graphic object indicating a speed range calculated for maintaining a safe distance from another vehicle is output.

Referring to FIG. 17, a speed range for keeping a predetermined safe driving distance from another vehicle may be calculated. Graphic objects corresponding to the calculated speed range may be displayed as stripes (or bars) on the rim (or edge) of the speedometer. Here, each of the graphic objects may be displayed in different colors, shapes, sizes, and the like at different positions.

In some implementations, a speed range for driving while maintaining a predetermined safe distance from the preceding (front-side) vehicle or the following (rear-side) vehicle may be calculated. Alternatively, speed ranges for driving while maintaining a predetermined safe distance from both the preceding and following vehicles may be calculated.

In some implementations, in order to maintain a predetermined safe distance from another vehicle, a first speed range which is the most recommended speed range, a second speed range which is the second-best recommended speed range, and a third speed range which is not recommended may be calculated.

Accordingly, a first graphic object 1710 corresponding to the first speed range, a second graphic object 1720 corresponding to the second speed range, and a third graphic object 1730 corresponding to the third speed range may be displayed as stripes (or bars) with different colors on the rim (or edge) of the speedometer.

Here, the speed of the preceding and following vehicles, a distance between vehicles, and the like may be obtained through the sensor of the vehicle 100 or V2V communication information.

In some implementations, an icon indicating the current recommended mode (the predetermined condition) may be output to a position adjacent to the speedometer. In detail, an icon 1740 indicating that the current recommended mode is a mode for maintaining a safe distance from another vehicle may also be displayed next to the speedometer.

In addition or alternatively, recommendation reference information 1750 indicating whether a speed range recommendation is determined based on one either the preceding vehicle or the following vehicle, or both the proceeding and following vehicles may also be output to the cluster.

In detail, when a speed range for keeping a predetermined safe driving distance from the preceding vehicle is calculated, a speed of the preceding vehicle and a distance from the preceding vehicle may be displayed on the recommendation reference information 1750.

Similarly, when a speed range for maintaining a predetermined safe driving distance from the following vehicle is calculated, a speed of the following vehicle and a distance from the following vehicle may be displayed on the recommendation reference information 1750.

When speed ranges for keeping a predetermined safe driving distance from both the preceding and following vehicles are calculated, respective speeds of the preceding and following vehicles and respective distances from the preceding and following vehicles are all displayed on the recommendation reference information 1750.

Figure 18:
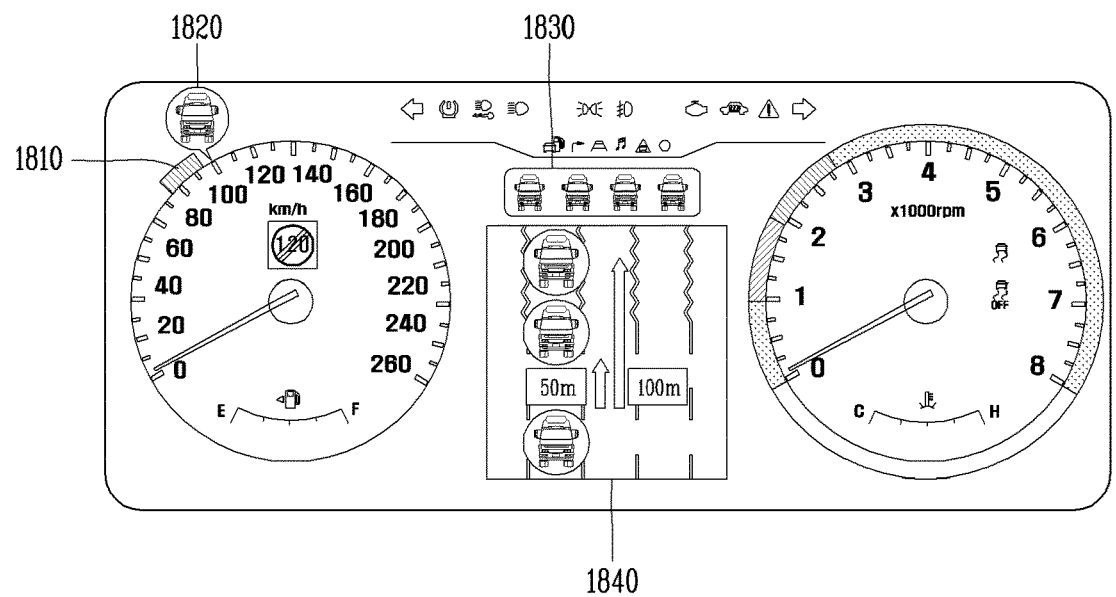
FIG. 18 is a diagram illustrating an exemplary display of graphic object indicating a speed range calculated to maintain platooning is output.

FIG. 18 is a diagram illustrating an exemplary display of graphic object indicating a speed range calculated to maintain platooning (or flocking) is output.

Referring to FIG. 18, a speed range that allows a group of vehicles to drive together while maintaining a safe distance is calculated. A graphic object 1810 corresponding to the calculated speed range may be displayed as a stripe (or bar) on the rim (or edge) of the speedometer.

In some implementations, an icon 1820 indicating a speed of the lead vehicle may be displayed on the speedometer.

In some implementations, an icon indicating the current recommended mode (the predetermined condition) may be output to a position adjacent to the speedometer. In detail, an icon 1830 indicating that the current recommended mode is for maintaining the distance between platoons may be displayed next to the speedometer.

Further, distance information 1840 showing a distance from the lead vehicle and a distance from the preceding vehicle (front-side vehicle) may also be output to the cluster.

In some implementations, the controller 830 may calculate the speed range based on a situation (or circumstance) in which the vehicle 100 enters a predetermined area.

The situation of entering the predetermined area may include entering an intersection, changing a lane, entering a specific building or parking lot, and the like.

Figure 19:
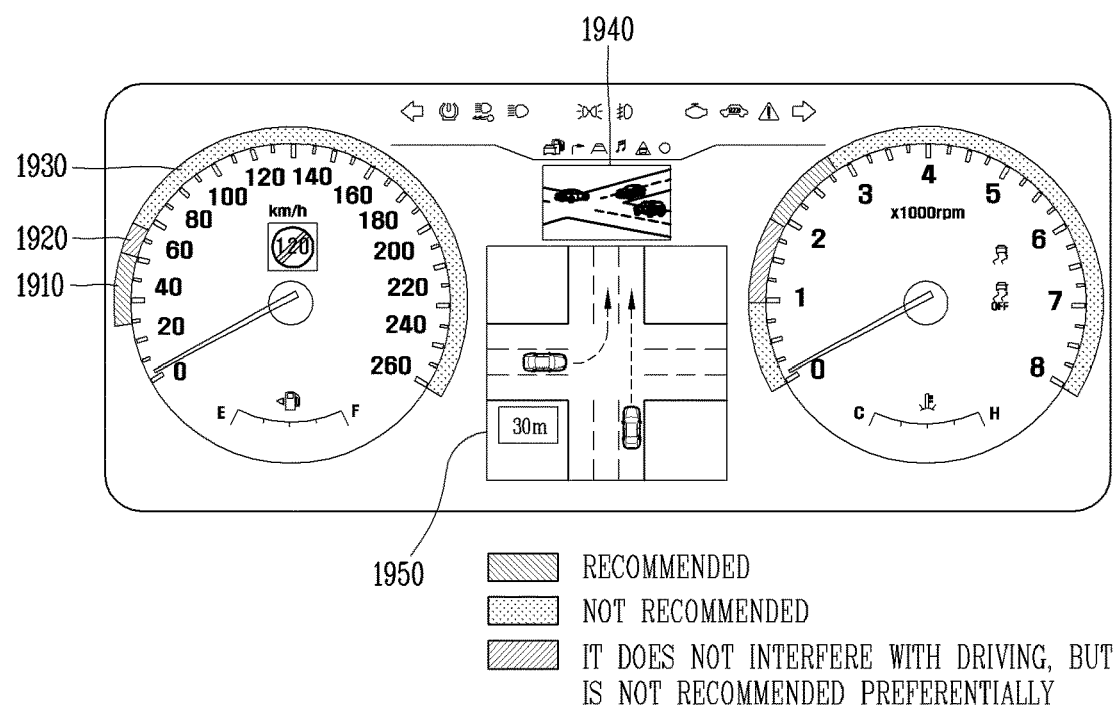
FIG. 19 is a diagram illustrating an exemplary display of graphic object indicating a speed range calculated for entering an intersection is output.

FIG. 19 is a diagram illustrating an exemplary display of graphic object indicating a speed range calculated for entering an intersection is output.

Referring to FIG. 19, when entering an intersection, a speed range for preventing collision with another vehicle may be calculated. Graphic objects corresponding to the calculated speed range may be displayed as stripes (or bars) on the rim (or edge) of the speedometer. Here, each of the graphic objects may be displayed in different colors, shapes, sizes, and the like at different positions.

In some implementations, a first speed range which is the most recommended speed range for safe driving at the intersection, a second speed range which is the second-best recommended speed range, and a third speed range which is not recommended may be calculated.

Accordingly, a first graphic object 1910 corresponding to the first speed range, a second graphic object 1920 corresponding to the second speed range, and a third graphic object 1930 corresponding to the third speed range may be displayed as stripes (or bars) with different colors on the rim (edge) of the speedometer.

Here, information such as a location, speed, and driving direction of other vehicles around the intersection may be received through V2X communication.

In some implementations, an icon indicating the current recommended mode (the predetermined reference) may be output to a position adjacent to the speedometer. In detail, an icon 1940 indicating that the current recommended mode is based on entering the intersection may also be displayed next to the speedometer.

In addition or alternatively, information 1950 of the location, speed, driving direction of other vehicles around the intersection may also be output to the cluster. Here, a high-definition (HD) map and positioning (location determination) may be applied to display information at the intersection in lane units (or according to each lane).

Figure 20:
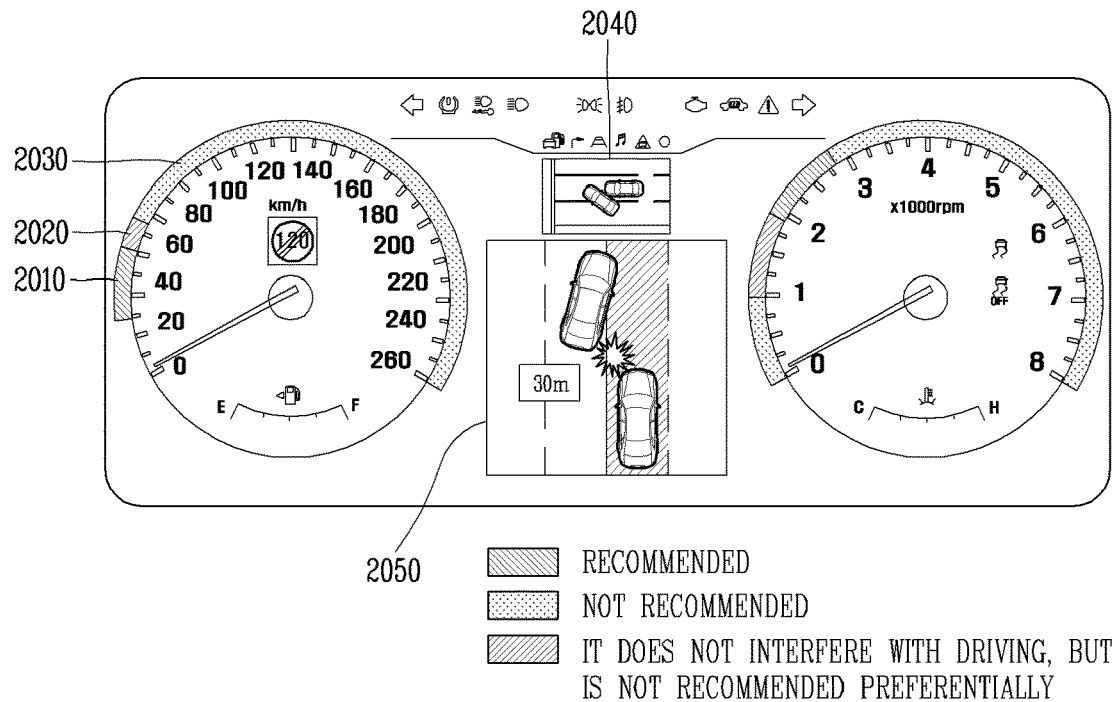
FIG. 20 is a diagram illustrating an exemplary display of graphic object indicating a speed range calculated for a lane change is output.

FIG. 20 is a diagram illustrating an exemplary display of graphic object indicating a speed range calculated for a lane change is output.

Referring to FIG. 20, when a lane is changed, a speed range for preventing collision with another vehicle may be calculated, and graphic objects corresponding to the calculated speed range may be displayed as stripes (or bars) on the rim (or edge) of the speedometer. Here, each of the graphic objects may be displayed in different colors, shapes, sizes, and the like at different positions.

In some implementations, a first speed range which is the most recommended speed range for safe driving when changing a lane, a second speed range which is the second-best recommended speed range, and a third speed range which is not recommended may be calculated.

Accordingly, a first graphic object 2010 corresponding to the first speed range, a second graphic object 2020 corresponding to the second speed range, and a third graphic object 2030 corresponding to the third speed range may be displayed as stripes (or bars) with different colors on the rim (edge) of the speedometer.

Here, information such as a location, speed, and driving direction of other vehicles nearby may be received through V2X communication.

In some implementations, an icon indicating the current recommended mode (the predetermined condition) may be output to a position adjacent to the speedometer. In detail, an icon 2040 indicating that the current recommended mode is based on changing a lane may also be displayed next to the speedometer.

Further, information 2050 of the received location, speed, driving direction of other vehicles nearby may also be output to the cluster. Here, an HD map and positioning may be applied to display information at an intersection in land units.

Figure 21:
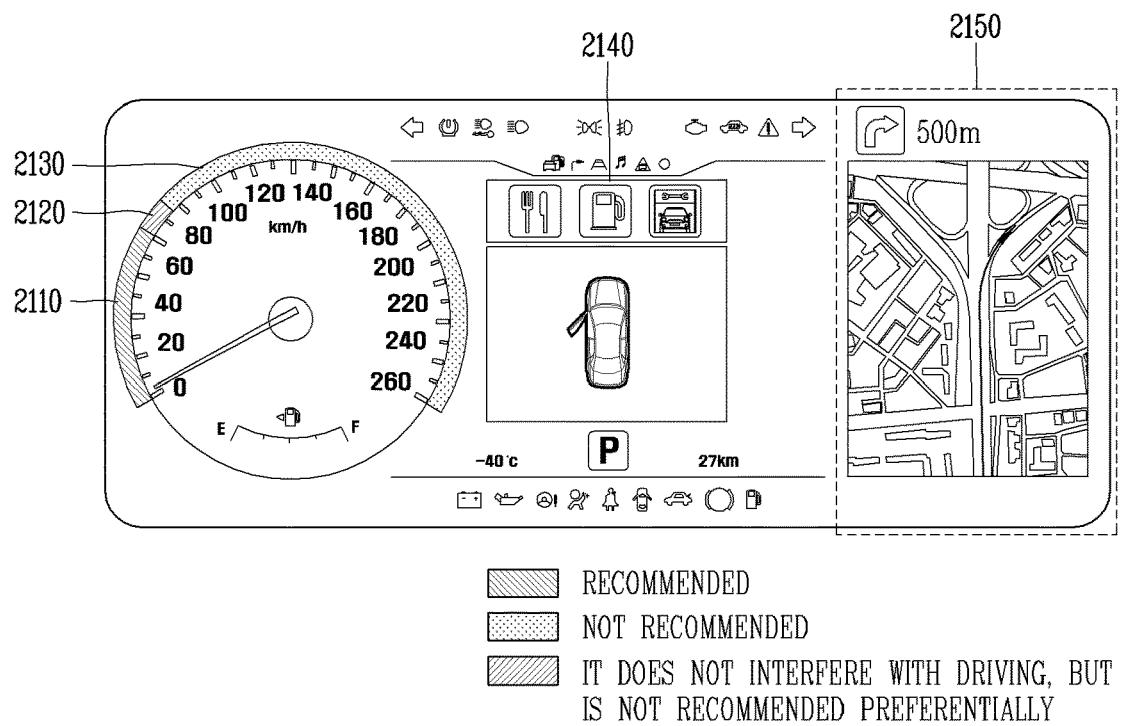
FIG. 21 is a diagram illustrating an exemplary display of graphic object indicating a speed range calculated for entering a convenience facility is output.

FIG. 21 is a diagram illustrating an exemplary display of graphic object indicating a speed range calculated for entering a convenience facility is output.

Referring to FIG. 21, a speed range for entering a convenience facility such as a rest stop, a gas station, a charging station, an automobile repair shop, and the like. In addition or alternatively, graphic objects corresponding to the calculated speed range may be displayed as stripes (or bars) on the rim (or edge) of the speedometer. Here, each of the graphic objects may be displayed in different colors, shapes, sizes, and the like at different positions.

In some implementations, a first speed range which is the most recommended speed range for entering a convenient facility, a second speed range which is the second-best recommended speed range, and a third speed range which is not recommended may be calculated.

Accordingly, a first graphic object 2110 corresponding to the first speed range, a second graphic object 2120 corresponding to the second speed range, and a third graphic object 2130 corresponding to the third speed range may be displayed as stripes (or bars) with different colors on the rim (or edge) of the speedometer.

In some implementations, an icon indicating the current recommended mode (the predetermined condition) may be output to a position adjacent to the speedometer. In detail, an icon 2140 indicating that the current recommended mode is based on entering the convenience facility may also be displayed next to the speedometer.

In some implementations, the remaining distance to the convenience facility, TBT information, map information 2150, and the like may also be output to the cluster. Here, an RPM region may be used to display the information.

Figure 22:
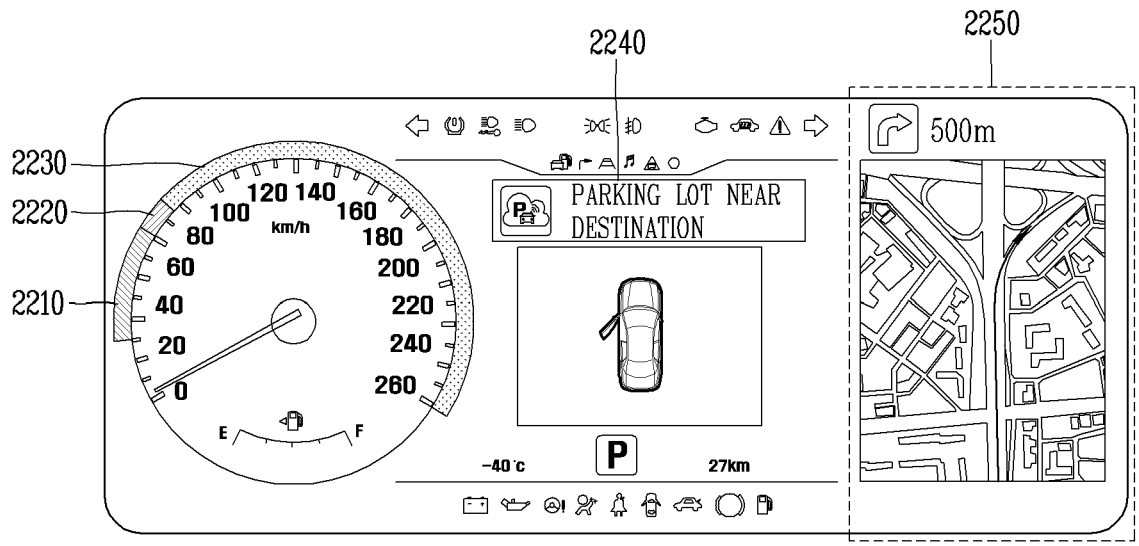
FIG. 22 is a diagram illustrating an exemplary display of graphic object indicating a speed range calculated for entering a parking lot is output.

FIG. 22 is a diagram illustrating an exemplary display of graphic object indicating a speed range calculated for entering a parking lot is output.

Referring to FIG. 22, when a route is guided, a speed range for entering a parking lot near the destination may be calculated. In addition or alternatively, graphic objects corresponding to the calculated speed range may be displayed as a stripe (or bar) on the rim (edge) of the speedometer. Here, each of the graphic objects may be displayed in different colors, shapes, sizes, and the like at different positions.

In some implementations, a first speed range which is the most recommended speed range for entering the parking lot, a second speed range which is the second-best recommended speed range, and a third speed range which is not recommended may be calculated.

Accordingly, a first graphic object 2210 corresponding to the first speed range, a second graphic object 2220 corresponding to the second speed range, and a third graphic object 2230 corresponding to the third speed range may be displayed as stripes (or bars) with different colors on the rim (or edge) of the speedometer.

In some implementations, an icon indicating the current recommended mode (the predetermined condition) may be output to a position adjacent to the speedometer. In detail, an icon 2240 indicating that the current recommended mode is based on entering the parking lot may also be displayed next to the speedometer.

In some implementations, the remaining distance to the parking lot, TBT information, parking lot map information 2250, and the like may also be output to the cluster. Here, the information may be output to an RPM region.

In some implementations, the controller 830 may calculate the speed range in consideration of status information of the vehicle 100.

Figure 23:
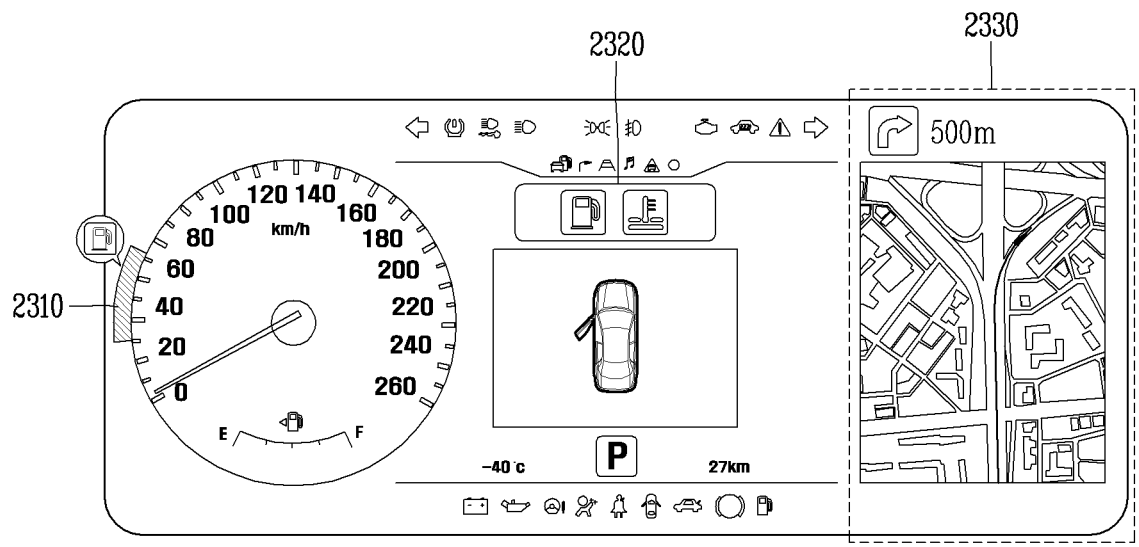
FIG. 23 is a diagram illustrating an exemplary display of graphic object indicating a speed range calculated based on the vehicle status (or condition) is output.

FIG. 23 is a diagram illustrating an exemplary display of graphic indicating a speed range calculated based on the vehicle status (or condition) is output.

Referring to FIG. 23, when the remaining fuel level (or amount) falls below a set reference value, an optimal speed range based on the remaining fuel amount may be calculated.

In some implementations, when a temperature of engine oil or a coolant becomes higher than a reference value, an optimal speed range may be calculated by taking this vehicle condition into consideration.

Then, a graphic object 2310 corresponding to the calculated speed range may be displayed as a stripe (bar) on the rim (edge) of the speedometer.

In some implementations, an icon indicating the current recommended mode (the predetermined condition) may be output at a position adjacent to the speedometer. In detail, an icon 2320 indicating that the current recommended mode is based on the current vehicle condition may also be displayed next to the speedometer.

In addition or alternatively, the remaining distance to a gas station or an automobile repair (service) shop, TBT information, map information 2330, and the like may also be output to the cluster. Here, the information may be output by utilizing an RPM region.

Figure 24:
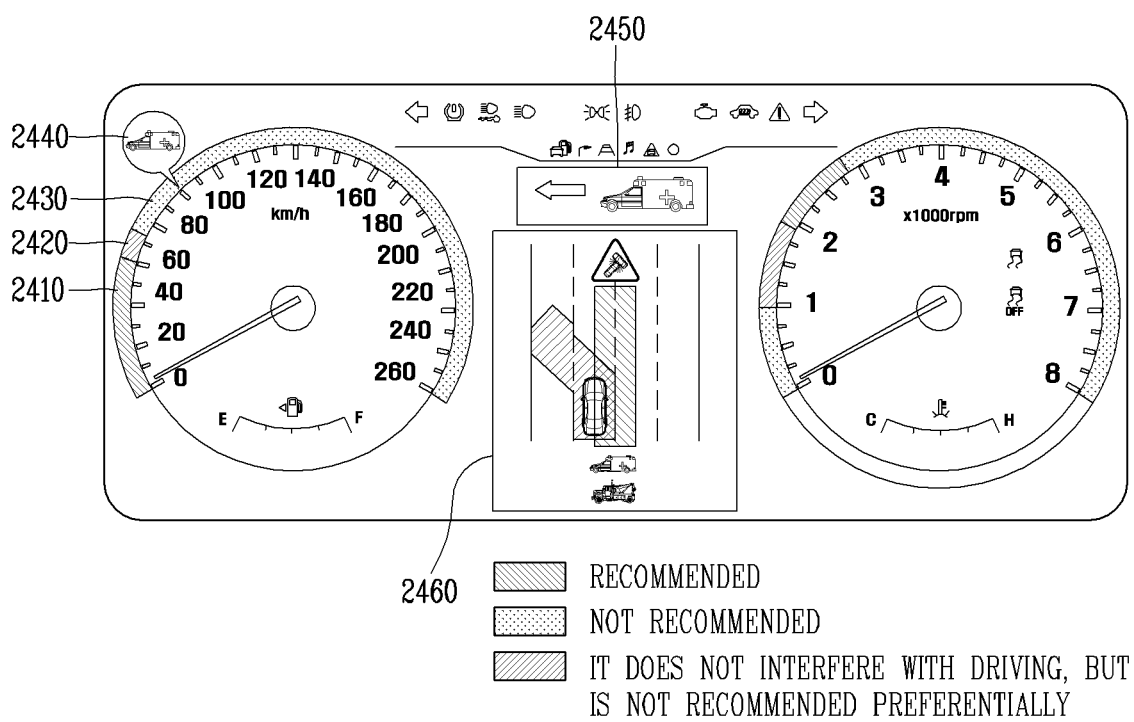
FIG. 24 is a diagram illustrating an exemplary display of graphic object indicating a speed range calculated for allowing an emergency vehicle to pass is output.

FIG. 24 is a diagram illustrating an exemplary display of graphic object indicating a speed range calculated for allowing an emergency vehicle to pass is output.

Referring to FIG. 24, when an emergency vehicle is approaching, an optimal speed range for allowing the emergency vehicle to pass may be calculated. In addition or alternatively, graphic objects corresponding to the calculated speed range may be displayed as stripes (or bars) on the rim (or edge) of the speedometer. Here, each of the graphic objects may be displayed in different colors, shapes, sizes, and the like at different positions.

In some implementations, a first speed range which is the most recommended speed range for allowing the emergence vehicle to pass through, a second speed range which is the second-best recommended speed range, and a third speed range which is not recommended may be calculated.

Accordingly, a first graphic object 2410 corresponding to the first speed range, a second graphic object 2420 corresponding to the second speed range, and a third graphic object 2430 corresponding to the third speed range may be displayed as stripes (or bars) with different colors on the rim (edge) of the speedometer.

In addition or alternatively, an icon 2440 indicating a driving speed of the emergency vehicle may be displayed on the speedometer.

In some implementations, an icon indicating the current recommended mode (the predetermined condition) may be output to a position adjacent to the speedometer. In detail, an icon 2450 indicating that the current recommended mode is based on a situation of the emergency vehicle approaching may also be displayed next to the speedometer.

Here, information such as a location of the emergency vehicle and other vehicles nearby, a speed, and a driving direction may be received through V2X communication.

In some implementations, information, for example, lane information of the emergency vehicle and lane information to be reserved for the emergency vehicle, direction information for the vehicle 100 to move for the emergency vehicle, information 2460 regarding a distance from the emergency vehicle may also be output to the cluster. Here, a HD map and positioning may be applied to display the information in lane units.

The effects of a display device provided in a vehicle and a method of controlling the display device according to the present disclosure will be as follows.

According to at least one of the implementations described herein, an optimal speed range calculated in consideration of various surrounding situations may be recommended based on vehicle driving information.

In addition or alternatively, each of the speed ranges may be displayed as a graphic object with a different color, shape, and size on a speedometer in a clear and simple manner, so that the driver can easily recognize (or check) the recommended speed range.

In another example, a graphic object indicating the speed range may be displayed on the speedometer in a distinctive manner by changing (or adjusting) a minimum value, a maximum value, a unit interval of speed corresponding to a speedometer graduation interval.

This may result in improving convenience of the driver.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described implementations are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. A display device included in a vehicle, the display device comprising:
   a communication unit configured to receive vehicle driving information;
   a display; and
   a controller,
   wherein the controller is configured to:
      calculate a speed range based on the received vehicle driving information,
      control the display to display a graphic object representative of the calculated speed range on the display, and
      control the display to adjust at least one of a minimum value, a maximum value, or a unit interval of speeding corresponding to a graduation interval of a speedometer on the display, based on a difference between a first speed value and a second value, and a comparison of the calculated speed range against the first speed value and the second speed value.

2. The display device of claim 1, wherein the controller is configured to calculate the speed range based on traffic signal information.

3. The display device of claim 2, wherein the controller is configured to calculate, based on the traffic signal information and a predetermined area, a plurality of speed ranges, each of the plurality of speed ranges providing a speed range to keep the vehicle moving without stopping for entering the predetermined area or to stop the vehicle before entering the predetermined area.

4. The display device of claim 3, wherein the controller is configured to control the display to display a plurality of graphic objects corresponding to the calculated plurality of speed ranges.

5. The display device of claim 4, wherein the displayed plurality of graphic objects includes a graphic object with a predetermined color corresponding to a location of the vehicle.

6. The display device of claim 1, wherein the controller is configured to control the display to decrease the maximum value of the speedometer to a predetermined value based on a comparison between the difference and the predetermined value.

7. The display device of claim 1, wherein the controller is configured to control the display to reduce a unit interval of speed in the speedometer corresponding to the calculated speed range to a predetermined value based on a comparison between the difference and the predetermined value.

8. The display device of claim 1, wherein the controller is configured to control the display to enlarge a part of the speedometer corresponding to the calculated speed range based on a comparison between the difference and a predetermined value.

9. The display device of claim 1, wherein the controller is configured to control the communication unit to output a notification based a speed of the vehicle relative to the calculated speed range in a predetermined time.

10. The display device of claim 1, wherein the controller is configured control the display terminate the displayed graphic object based on a speed of the vehicle relative to the calculated speed range in a predetermined time.

11. The display device of claim 1, wherein the controller, based on a speed of the vehicle relative to the calculated speed range in a predetermined time, is configured to calculate a second speed range, and modify at least one of a size or a position of the graphic object according to the calculated second speed range.

12. The display device of claim 1, wherein the controller is configured to calculate the speed range based on speed limit information on a driving road.

13. The display device of claim 1, wherein the controller is configured to calculate the speed range based on driving mode information set in the vehicle.

14. The display device of claim 1, wherein the controller is configured to calculate the speed range based on information associated with a predetermined safe distance from another vehicle.

15. The display device of claim 1, wherein the controller is configured to calculate the speed range based on a vehicle's location relative to a predetermined area.

16. The display device of claim 1, wherein the controller is configured to calculate the speed range based on status information of the vehicle.

17. A method for controlling a display device included in a vehicle, the method comprising:
   receiving vehicle driving information from a communication unit;
   calculating a speed range based on the received vehicle driving information;
   displaying a graphic object representative of the calculated speed range on a display; and
   controlling the display to adjust at least one of a minimum value, a maximum value, or a unit interval of speeding corresponding to a graduation interval of a speedometer on the display, based on a difference between a first speed value and a second value, and a comparison of the calculated speed range against the first speed value and the second speed value.

18. The method of claim 17, wherein the calculating of the speed range includes calculating the speed range based on traffic signal information.

19. The method of claim 18, further comprising calculating, based on the traffic signal information and a predetermined area, a plurality of speed ranges, each of the plurality of speed range providing a speed range to keep the vehicle moving without stopping for entering the predetermined area or to stop the vehicle before entering the predetermined area.

* * * * *